United States Patent
Kumar et al.

(10) Patent No.: US 12,153,152 B2
(45) Date of Patent: Nov. 26, 2024

(54) USER EQUIPMENT (UE) HANDLING OF DELAYED SOUNDING REFERENCE SIGNAL (SRS) CONFIGURATION FOR DOWNLINK-AND-UPLINK-BASED POSITIONING METHODS

(71) Applicant: QUALCOMM Incorporated, San Diego, CA (US)

(72) Inventors: Mukesh Kumar, Hyderabad (IN); Guttorm Ringstad Opshaug, Redwood City, CA (US); Ie-Hong Lin, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 358 days.

(21) Appl. No.: 17/814,973

(22) Filed: Jul. 26, 2022

(65) Prior Publication Data
US 2024/0036146 A1    Feb. 1, 2024

(51) Int. Cl.
*G01S 5/00* (2006.01)
*G01S 5/02* (2010.01)
*H04L 5/00* (2006.01)

(52) U.S. Cl.
CPC .......... *G01S 5/0063* (2013.01); *G01S 5/0236* (2013.01); *H04L 5/0051* (2013.01)

(58) Field of Classification Search
CPC ..... G01S 5/0063; G01S 5/0236; H04L 5/0051
See application file for complete search history.

(56) References Cited

U.S. PATENT DOCUMENTS

2023/0379860 A1*  11/2023  Rao .................... G01S 5/01

FOREIGN PATENT DOCUMENTS

| WO | 2021262406 A1 | 12/2021 |
| WO | 2022081893 A1 | 4/2022 |
| WO | 2022246344    | 11/2022 |
| WO | 2023014795 A1 | 2/2023 |

OTHER PUBLICATIONS

International Search Report and Written Opinion—PCT/US2023/023462—ISA/EPO—Sep. 12, 2023.
VIVO: "Discussion on Inactive State Positioning and On-Demand PRS", 3GPP TSG RAN WG1 #106bis-e, R1-2108980, 3rd Generation Partnership Project, Mobile Competence Centre, 650, Route Des Lucioles, F-06921 Sophia-Antipolis Cedex, France, vol. RAN WG1, No. e-Meeting, Oct. 11, 2021-Oct. 19, 2021, 18 Pages. Oct. 1, 2021, XP052057815, figure 1, table 1, sections 1, 2, 2.1.2, 2.2, 2.2.1, 3, 3.1.1, 3.1.2, 3.3.1, paragraphs [2.1.1]-[3.1.1].

* cited by examiner

*Primary Examiner* — Curtis B Odom
(74) *Attorney, Agent, or Firm* — Thien T. Nguyen

(57) ABSTRACT

Disclosed are techniques for wireless communication. In an aspect, a user equipment (UE) receives, from a location server, a positioning reference signal (PRS) configuration for a downlink-and-uplink-based positioning session between the UE and the location server, waits, based on a determination that a sounding reference signal (SRS) configuration for the downlink-and-uplink-based positioning session has not been received from a serving base station of the UE, for reception of the SRS configuration from the serving base station until expiration of a timer, and determines, based on the expiration of the timer, whether the SRS configuration was received.

30 Claims, 22 Drawing Sheets

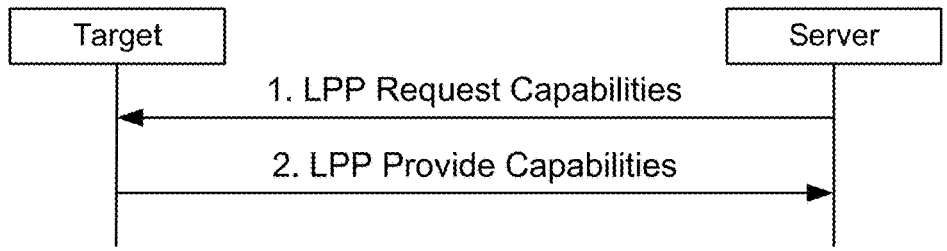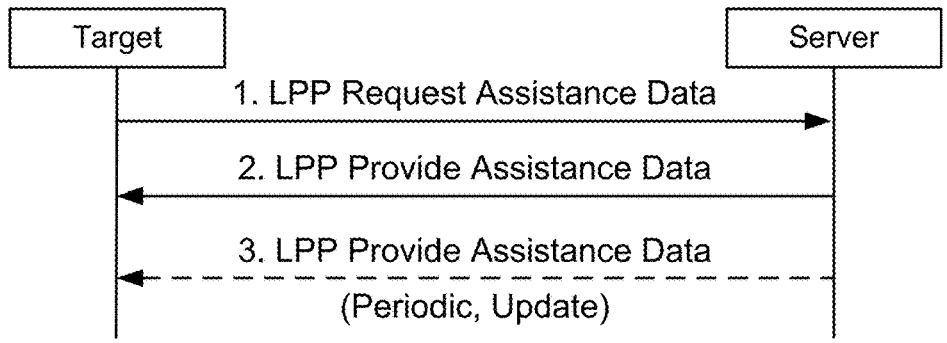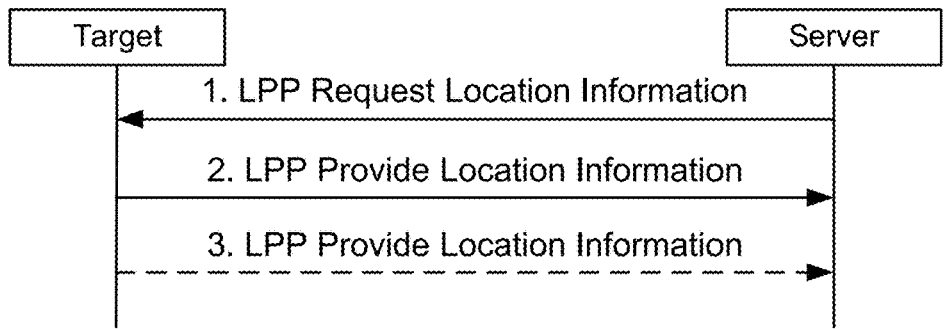
FIG. 5

850 →
Comb-2 with 12 symbols
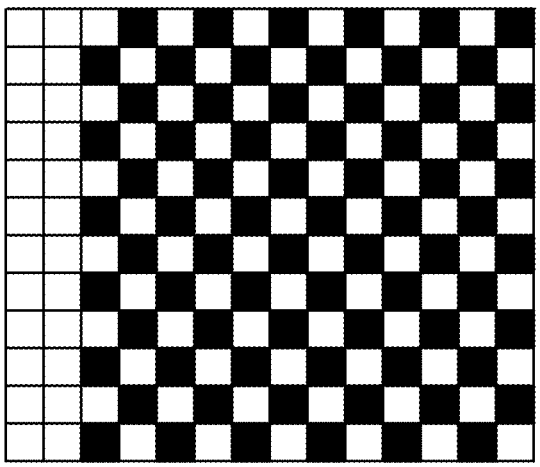
860 →
Comb-4 with 12 symbols
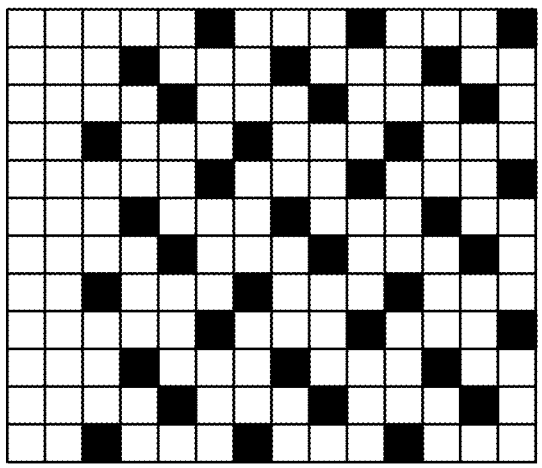
Comb-2 with 6 symbols
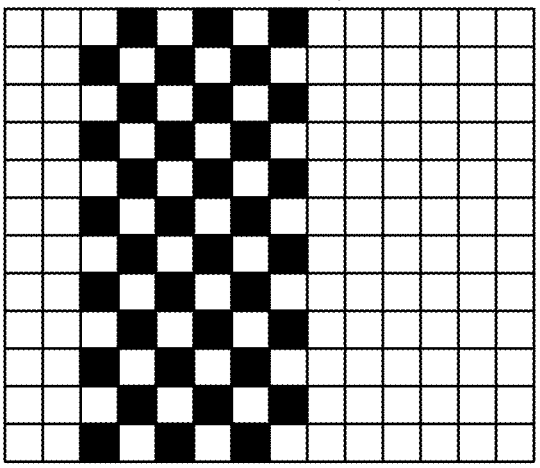
Comb-6 with 12 symbols
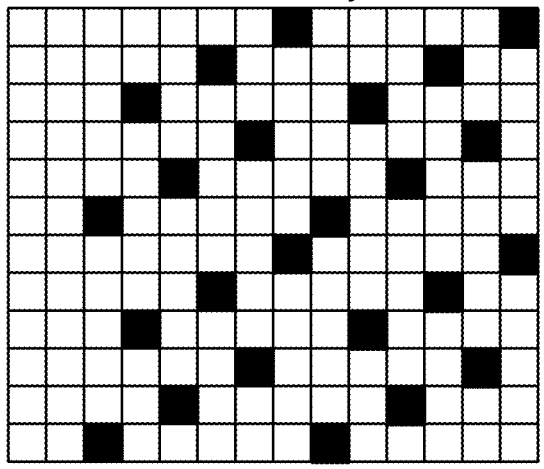
870 ↗
880 ↗
*FIG. 8B*

950 ➘
Comb-4 with 4 symbols
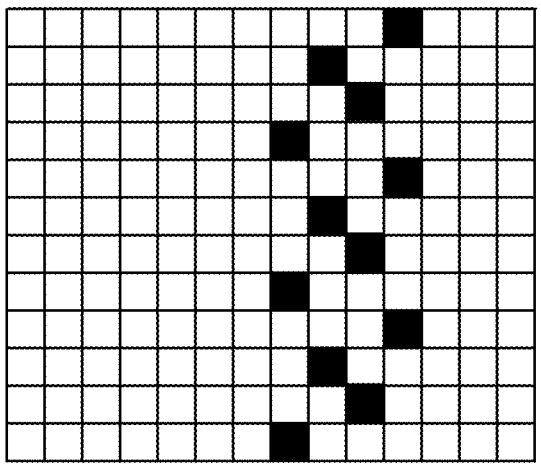
960 ➘
Comb-4 with 8 symbols
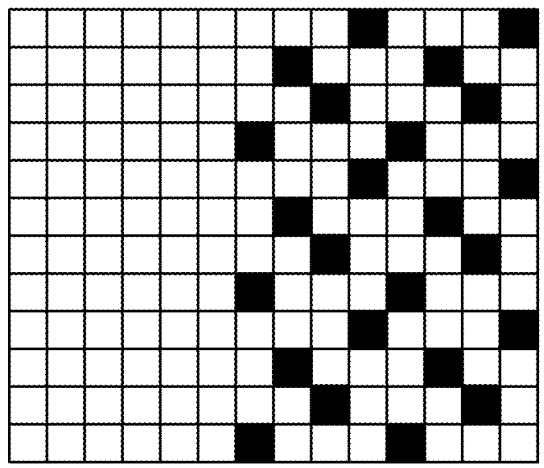
Comb-8 with 4 symbols
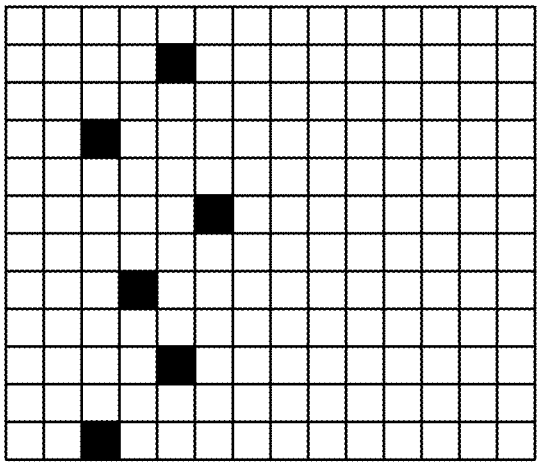
970 ➚
Comb-8 with 8 symbols
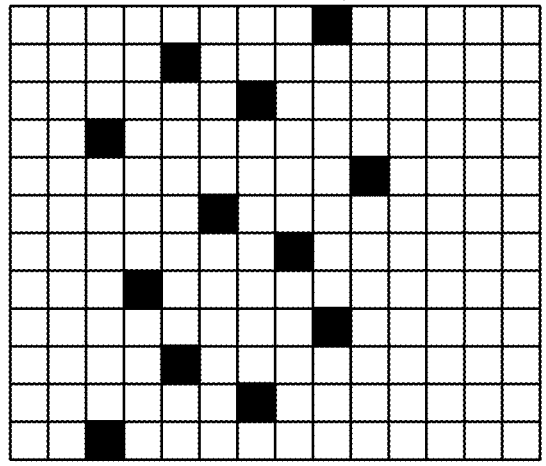
980 ➚
*FIG. 9B*

```
QoS ::= SEQUENCE {
    horizontalAccuracy              HorizontalAccuracy      OPTIONAL,
    verticalCoordinateRequest       BOOLEAN,
    verticalAccuracy                VerticalAccuracy        OPTIONAL,
    responseTime                    ResponseTime            OPTIONAL,
    velocityRequest                 BOOLEAN,
    ...,
    [[ responseTimeNB-r14           ResponseTimeNB-r14      OPTIONAL
    ]],
    [[ horizontalAccuracyExt-r15    HorizontalAccuracyExt-r15   OPTIONAL,
       verticalAccuracyExt-r15      VerticalAccuracyExt-r15     OPTIONAL
    ]]
}
```

1100

```
ResponseTime ::= SEQUENCE {
    time                        INTEGER (1..128),
    ...,
    [[ responseTimeEarlyFix-r12 INTEGER (1..128)                OPTIONAL
    ]],
    [[ unit-r15                 ENUMERATED { ten-seconds, ... } OPTIONAL
    ]]
}
```

```
NR-Multi-RTT-LocationServerErrorCauses-r16 ::= SEQUENCE {
    cause-r16       ENUMERATED {
        undefined,
        assistanceDataNotSupportedByServer,
        assistanceDataSupportedButCurrentlyNotAvailableByServer,
        ...
    },
    ...
}

NR-Multi-RTT-TargetDeviceErrorCauses-r16 ::= SEQUENCE {
    cause-r16       ENUMERATED {
        undefined,
        dl-assistance-data-missing,
        unableToMeasureAnyTRP,
        attemptedButUnableToMeasureSomeNeighbourTRPs,
        ul-srs-configuration-missing,
        unableToTransmit-ul-srs,
        ...
    },
    ...
}
```

1200 → (first block)

1250 → (second block)

FIG. 12

USER EQUIPMENT (UE) HANDLING OF DELAYED SOUNDING REFERENCE SIGNAL (SRS) CONFIGURATION FOR DOWNLINK-AND-UPLINK-BASED POSITIONING METHODS

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), enables higher data transfer speeds, greater numbers of connections, and better coverage, among other improvements. The 5G standard, according to the Next Generation Mobile Networks Alliance, is designed to provide higher data rates as compared to previous standards, more accurate positioning (e.g., based on reference signals for positioning (RS-P), such as downlink, uplink, or sidelink positioning reference signals (PRS)), and other technical enhancements. These enhancements, as well as the use of higher frequency bands, advances in PRS processes and technology, and high-density deployments for 5G, enable highly accurate 5G-based positioning.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of wireless communication performed by a user equipment (UE) includes receiving, from a location server, a positioning reference signal (PRS) configuration for a downlink-and-uplink-based positioning session between the UE and the location server; waiting, based on a determination that a sounding reference signal (SRS) configuration for the downlink-and-uplink-based positioning session has not been received from a serving base station of the UE, for reception of the SRS configuration from the serving base station until expiration of a timer; and determining, based on the expiration of the timer, whether the SRS configuration was received.

In an aspect, a user equipment (UE) includes a memory; at least one transceiver; and at least one processor communicatively coupled to the memory and the at least one transceiver, the at least one processor configured to: receive, via the at least one transceiver, from a location server, a positioning reference signal (PRS) configuration for a downlink-and-uplink-based positioning session between the UE and the location server; wait, based on a determination that a sounding reference signal (SRS) configuration for the downlink-and-uplink-based positioning session has not been received from a serving base station of the UE, for reception of the SRS configuration from the serving base station until expiration of a timer; and determine, based on the expiration of the timer, whether the SRS configuration was received.

In an aspect, a user equipment (UE) includes means for receiving, from a location server, a positioning reference signal (PRS) configuration for a downlink-and-uplink-based positioning session between the UE and the location server; means for waiting, based on a determination that a sounding reference signal (SRS) configuration for the downlink-and-uplink-based positioning session has not been received from a serving base station of the UE, for reception of the SRS configuration from the serving base station until expiration of a timer; and means for determining, based on the expiration of the timer, whether the SRS configuration was received.

In an aspect, a non-transitory computer-readable medium stores computer-executable instructions that, when executed by a user equipment (UE), cause the UE to: receive, from a location server, a positioning reference signal (PRS) configuration for a downlink-and-uplink-based positioning session between the UE and the location server; wait, based on a determination that a sounding reference signal (SRS) configuration for the downlink-and-uplink-based positioning session has not been received from a serving base station of the UE, for reception of the SRS configuration from the serving base station until expiration of a timer; and determine, based on the expiration of the timer, whether the SRS configuration was received.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

FIG. 5 illustrates an example Long-Term Evolution (LTE) positioning protocol (LPP) capability transfer procedure, assistance data transfer procedure, and location information transfer procedure between a target device and a location server, according to aspects of the disclosure.

FIGS. 8A and 8B illustrate various comb patterns supported for downlink positioning reference signals (PRS) within a resource block.

FIGS. 9A and 9B illustrate various comb patterns supported for sounding reference signals (SRS) within a resource block.

FIG. 11 illustrates an example "QoS" information element (IE) and an example "ResponseTime" IE, according to aspects of the disclosure.

FIG. 12 illustrates an example "NR-Multi-RTT-LocationServerErrorCauses" IE and an example "NR-Multi-RTT-TargetDeviceErrorCauses" IE, according to aspects of the disclosure.

DETAILED DESCRIPTION

Figure 1:
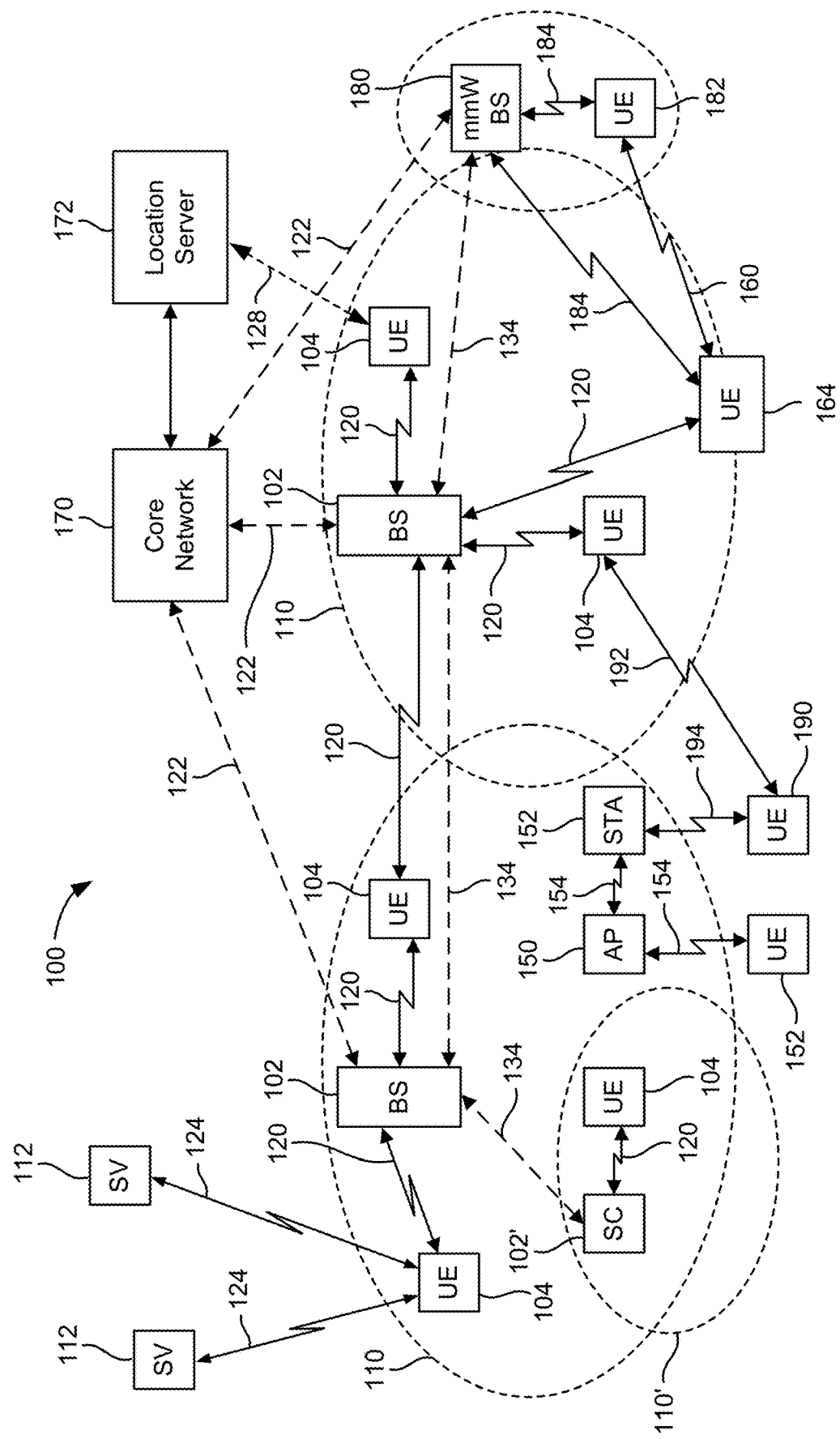
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, consumer asset locating device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on the Institute of Electrical and Electronics Engineers (IEEE) 802.11 specification, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

FIG. 1 illustrates an example wireless communications system 100, according to aspects of the disclosure. The wireless communications system 100 (which may also be referred to as a wireless wide area network (WWAN)) may include various base stations 102 (labeled "BS") and various UEs 104. The base stations 102 may include macro cell base stations (high power cellular base stations) and/or small cell base stations (low power cellular base stations). In an aspect, the macro cell base stations may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (e.g., a location management function (LMF) or a secure user plane location (SUPL) location platform (SLP)). The location server(s) 172 may be part of core network 170 or may be external to core network 170. A location server 172 may be integrated with a base station 102. A UE 104 may communicate with a location server 172 directly or indirectly. For example, a UE 104 may communicate with a location server 172 via the base station 102 that is currently serving that UE 104. A UE 104 may also communicate with a location server 172 through another path, such as via an application server (not shown), via another network, such as via a wireless local area network (WLAN) access point (AP) (e.g., AP 150 described below), and so on. For signaling purposes, communication between a UE 104 and a location server 172 may be represented as an indirect connection (e.g., through the core network 170, etc.) or a direct connection (e.g., as shown via direct connection 128), with the intervening nodes (if any) omitted from a signaling diagram for clarity.

In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labeled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

In some cases, the UE 164 and the UE 182 may be capable of sidelink communication. Sidelink-capable UEs (SL-UEs) may communicate with base stations 102 over communication links 120 using the Uu interface (i.e., the air interface between a UE and a base station). SL-UEs (e.g., UE 164, UE 182) may also communicate directly with each other over a wireless sidelink 160 using the PC5 interface (i.e., the air interface between sidelink-capable UEs). A wireless sidelink (or just "sidelink") is an adaptation of the core cellular (e.g., LTE, NR) standard that allows direct communication between two or more UEs without the communication needing to go through a base station. Sidelink communication may be unicast or multicast, and may be used for device-to-device (D2D) media-sharing, vehicle-to-vehicle (V2V) communication, vehicle-to-everything (V2X) communication (e.g., cellular V2X (cV2X) communication, enhanced V2X (eV2X) communication, etc.), emergency rescue applications, etc. One or more of a group of SL-UEs utilizing sidelink communications may be within the geographic coverage area 110 of a base station 102. Other SL-UEs in such a group may be outside the geographic coverage area 110 of a base station 102 or be otherwise unable to receive transmissions from a base station 102. In some cases, groups of SL-UEs communicating via sidelink communications may utilize a one-to-many (1:M) system in which each SL-UE transmits to every other SL-UE in the group. In some cases, a base station 102 facilitates the scheduling of resources for sidelink communications. In other cases, sidelink communications are carried out between SL-UEs without the involvement of a base station 102.

In an aspect, the sidelink 160 may operate over a wireless communication medium of interest, which may be shared with other wireless communications between other vehicles and/or infrastructure access points, as well as other RATs. A "medium" may be composed of one or more time, frequency, and/or space communication resources (e.g., encompassing one or more channels across one or more carriers) associated with wireless communication between one or more transmitter/receiver pairs. In an aspect, the medium of interest may correspond to at least a portion of an unlicensed frequency band shared among various RATs. Although different licensed frequency bands have been reserved for certain communication systems (e.g., by a government entity such as the Federal Communications Commission (FCC) in the United States), these systems, in particular those employing small cell access points, have recently extended operation into unlicensed frequency bands such as the Unlicensed National Information Infrastructure (U-NII) band used by wireless local area network (WLAN) technologies, most notably IEEE 802.11x WLAN technologies generally referred to as "Wi-Fi." Example systems of this type include different variants of CDMA systems, TDMA systems, FDMA systems, orthogonal FDMA (OFDMA) systems, single-carrier FDMA (SC-FDMA) systems, and so on.

Note that although FIG. 1 only illustrates two of the UEs as SL-UEs (i.e., UEs 164 and 182), any of the illustrated UEs may be SL-UEs. Further, although only UE 182 was described as being capable of beamforming, any of the illustrated UEs, including UE 164, may be capable of beamforming. Where SL-UEs are capable of beamforming, they may beamform towards each other (i.e., towards other SL-UEs), towards other UEs (e.g., UEs 104), towards base stations (e.g., base stations 102, 180, small cell 102', access point 150), etc. Thus, in some cases, UEs 164 and 182 may utilize beamforming over sidelink 160.

In the example of FIG. 1, any of the illustrated UEs (shown in FIG. 1 as a single UE 104 for simplicity) may receive signals 124 from one or more Earth orbiting space vehicles (SVs) 112 (e.g., satellites). In an aspect, the SVs 112 may be part of a satellite positioning system that a UE 104 can use as an independent source of location information. A satellite positioning system typically includes a system of transmitters (e.g., SVs 112) positioned to enable receivers (e.g., UEs 104) to determine their location on or above the Earth based, at least in part, on positioning signals (e.g., signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104. A UE 104 may include one or more dedicated receivers specifically designed to receive signals 124 for deriving geo location information from the SVs 112.

In a satellite positioning system, the use of signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or GPS and Geo Augmented Navigation system (GAGAN), and/or the like. Thus, as used herein, a satellite positioning system may include any combination of one or more global and/or regional navigation satellites associated with such one or more satellite positioning systems.

In an aspect, SVs 112 may additionally or alternatively be part of one or more non-terrestrial networks (NTNs). In an NTN, an SV 112 is connected to an earth station (also referred to as a ground station, NTN gateway, or gateway), which in turn is connected to an element in a 5G network, such as a modified base station 102 (without a terrestrial antenna) or a network node in a 5GC. This element would in turn provide access to other elements in the 5G network and ultimately to entities external to the 5G network, such as Internet web servers and other user devices. In that way, a UE 104 may receive communication signals (e.g., signals 124) from an SV 112 instead of, or in addition to, communication signals from a terrestrial base station 102.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

Figure 2A:
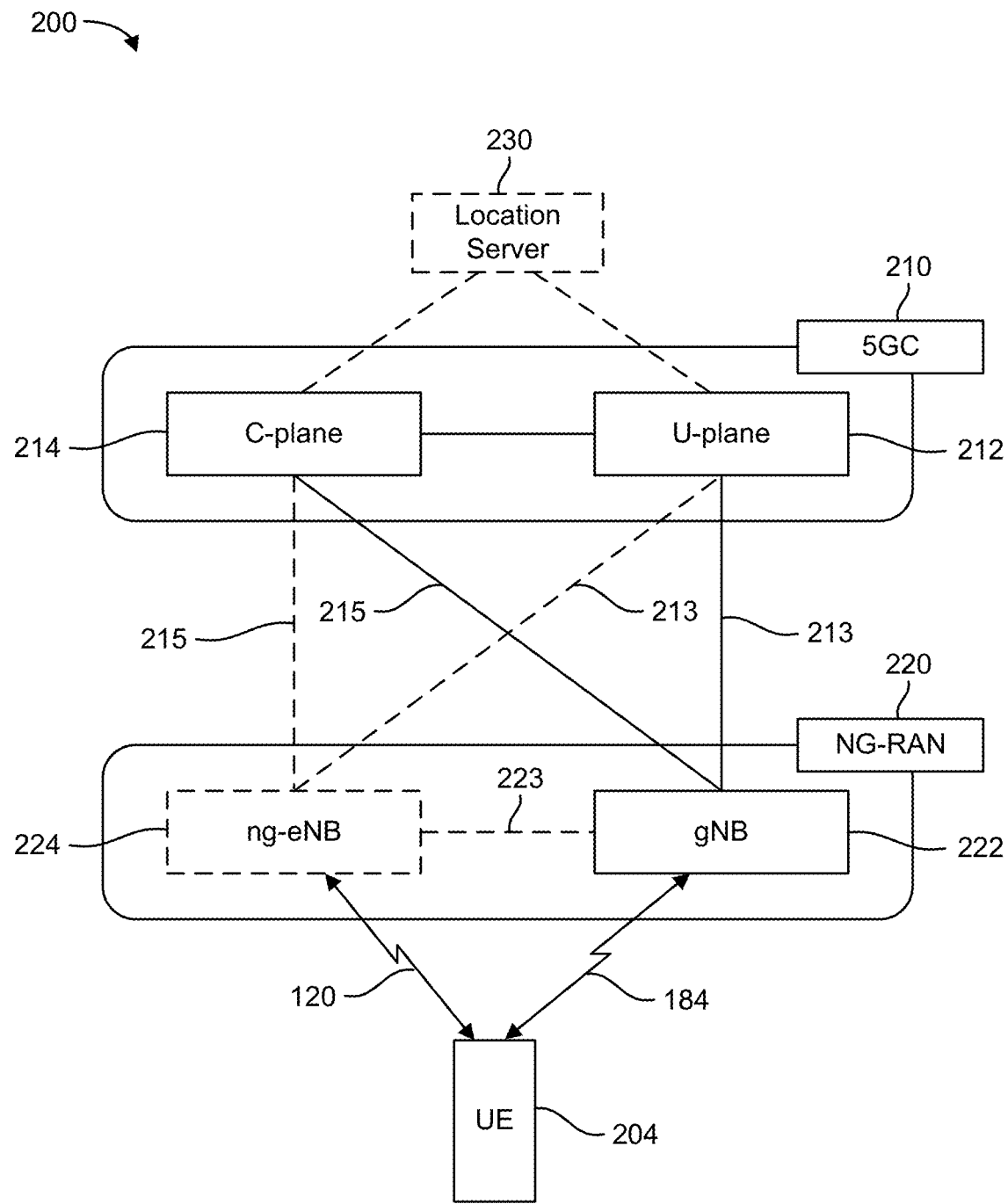
FIGS. 2A, 2B, and 2C illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane (C-plane) functions 214 (e.g., UE registration, authentication, network access, gateway selection, etc.) and user plane (U-plane) functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the user plane functions 212 and control plane functions 214, respectively. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may have one or more gNBs 222, while other configurations include one or more of both ng-eNBs 224 and gNBs 222. Either (or both) gNB 222 or ng-eNB 224 may communicate with one or more UEs 204 (e.g., any of the UEs described herein).

Another optional aspect may include a location server 230, which may be in communication with the 5GC 210 to provide location assistance for UE(s) 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network (e.g., a third party server, such as an original equipment manufacturer (OEM) server or service server).

Figure 2B:
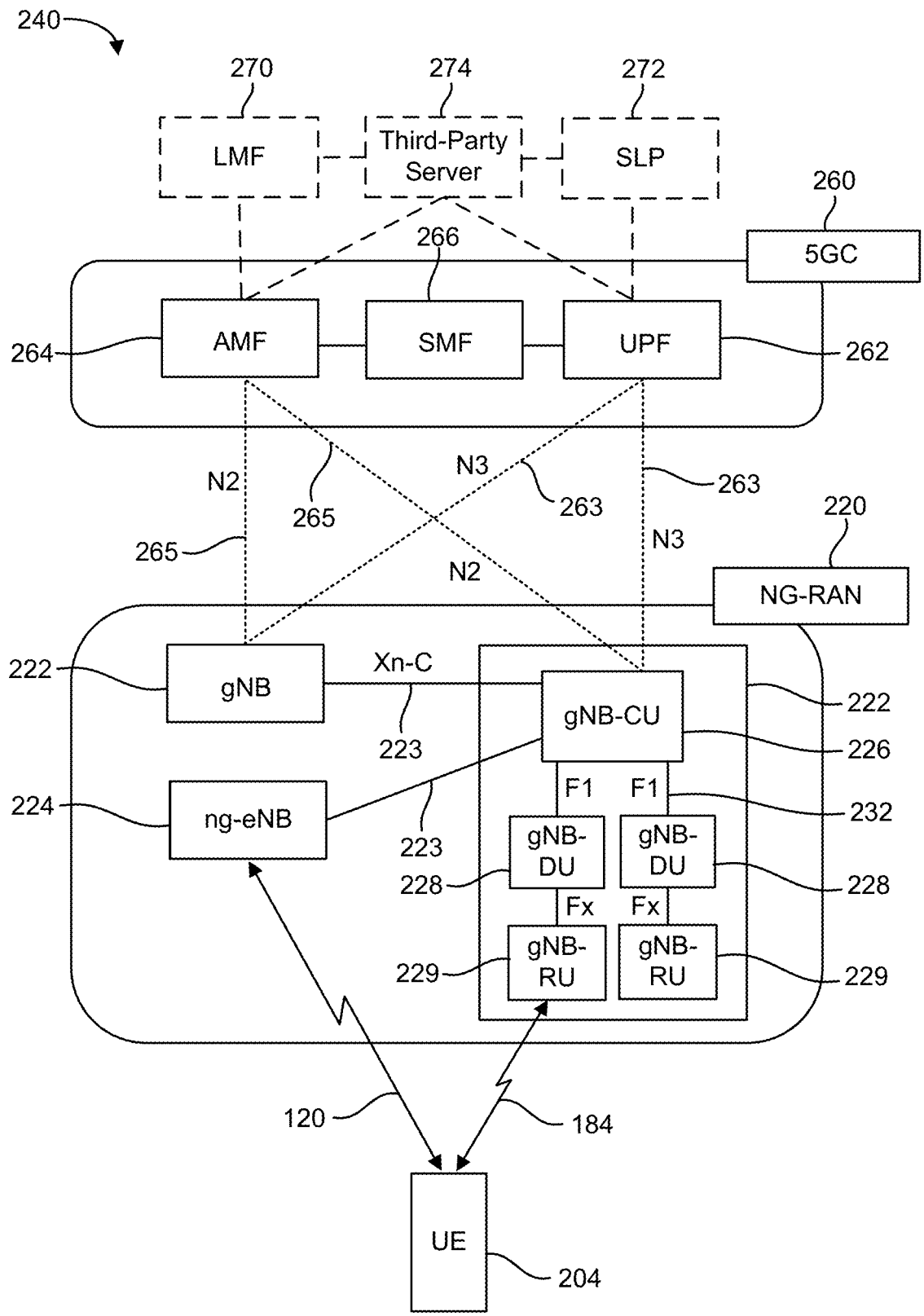

FIG. 2B illustrates another example wireless network structure 240. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). The functions of the AMF 264 include registration management, connection management, reachability management, mobility management, lawful interception, transport for session management (SM) messages between one or more UEs 204 (e.g., any of the UEs described herein) and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (e.g., third-party server 274) over a user plane (e.g., using protocols intended to carry voice and/or data like the transmission control protocol (TCP) and/or IP).

Yet another optional aspect may include a third-party server 274, which may be in communication with the LMF 270, the SLP 272, the 5GC 260 (e.g., via the AMF 264 and/or the UPF 262), the NG-RAN 220, and/or the UE 204 to obtain location information (e.g., a location estimate) for the UE 204. As such, in some cases, the third-party server 274 may be referred to as a location services (LCS) client or an external client. The third-party server 274 can be implemented as a plurality of separate servers (e.g., physically separate servers, different software modules on a single server, different software modules spread across multiple physical servers, etc.), or alternately may each correspond to a single server.

User plane interface 263 and control plane interface 265 connect the 5GC 260, and specifically the UPF 262 and AMF 264, respectively, to one or more gNBs 222 and/or ng-eNBs 224 in the NG-RAN 220. The interface between gNB(s) 222 and/or ng-eNB(s) 224 and the AMF 264 is referred to as the "N2" interface, and the interface between gNB(s) 222 and/or ng-eNB(s) 224 and the UPF 262 is referred to as the "N3" interface. The gNB(s) 222 and/or ng-eNB(s) 224 of the NG-RAN 220 may communicate directly with each other via backhaul connections 223, referred to as the "Xn-C" interface. One or more of gNBs 222 and/or ng-eNBs 224 may communicate with one or more UEs 204 over a wireless interface, referred to as the "Uu" interface.

The functionality of a gNB 222 may be divided between a gNB central unit (gNB-CU) 226, one or more gNB distributed units (gNB-DUs) 228, and one or more gNB radio units (gNB-RUs) 229. A gNB-CU 226 is a logical node that includes the base station functions of transferring user data, mobility control, radio access network sharing, positioning, session management, and the like, except for those functions allocated exclusively to the gNB-DU(s) 228. More specifically, the gNB-CU 226 generally host the radio resource control (RRC), service data adaptation protocol (SDAP), and packet data convergence protocol (PDCP) protocols of the gNB 222. A gNB-DU 228 is a logical node that generally hosts the radio link control (RLC) and medium access control (MAC) layer of the gNB 222. Its operation is controlled by the gNB-CU 226. One gNB-DU 228 can support one or more cells, and one cell is supported by only one gNB-DU 228. The interface 232 between the gNB-CU 226 and the one or more gNB-DUs 228 is referred to as the "F1" interface. The physical (PHY) layer functionality of a gNB 222 is generally hosted by one or more standalone gNB-RUs 229 that perform functions such as power amplification and signal transmission/reception. The interface between a gNB-DU 228 and a gNB-RU 229 is referred to as the "Fx" interface. Thus, a UE 204 communicates with the gNB-CU 226 via the RRC, SDAP, and PDCP layers, with a gNB-DU 228 via the RLC and MAC layers, and with a gNB-RU 229 via the PHY layer.

Deployment of communication systems, such as 5G NR systems, may be arranged in multiple manners with various components or constituent parts. In a 5G NR system, or network, a network node, a network entity, a mobility element of a network, a RAN node, a core network node, a network element, or a network equipment, such as a base station, or one or more units (or one or more components) performing base station functionality, may be implemented in an aggregated or disaggregated architecture. For example, a base station (such as a Node B (NB), evolved NB (eNB), NR base station, 5G NB, access point (AP), a transmit receive point (TRP), or a cell, etc.) may be implemented as an aggregated base station (also known as a standalone base station or a monolithic base station) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 2C:
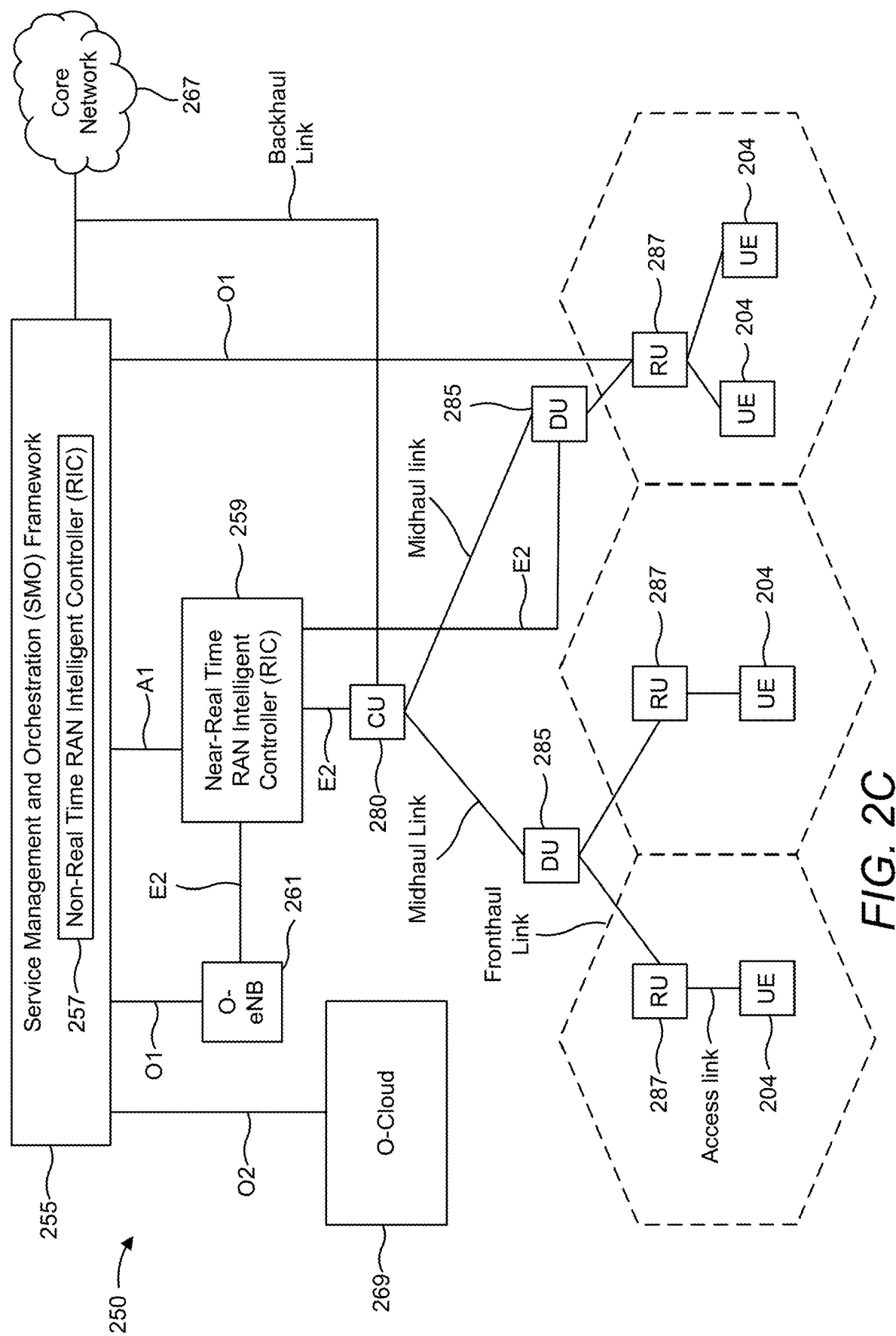

FIG. 2C illustrates an example disaggregated base station architecture 250, according to aspects of the disclosure. The disaggregated base station architecture 250 may include one or more central units (CUs) 280 (e.g., gNB-CU 226) that can communicate directly with a core network 267 (e.g., 5GC 210, 5GC 260) via a backhaul link, or indirectly with the core network 267 through one or more disaggregated base station units (such as a Near-Real Time (Near-RT) RAN Intelligent Controller (RIC) 259 via an E2 link, or a Non-Real Time (Non-RT) RIC 257 associated with a Service Management and Orchestration (SMO) Framework 255, or both). A CU 280 may communicate with one or more distributed units (DUs) 285 (e.g., gNB-DUs 228) via respective midhaul links, such as an F1 interface. The DUs 285 may communicate with one or more radio units (RUs) 287 (e.g., gNB-RUs 229) via respective fronthaul links. The RUs 287 may communicate with respective UEs 204 via one or more radio frequency (RF) access links. In some implementations, the UE 204 may be simultaneously served by multiple RUs 287.

Each of the units, i.e., the CUs 280, the DUs 285, the RUs 287, as well as the Near-RT RICs 259, the Non-RT RICs 257 and the SMO Framework 255, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 280 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 280. The CU 280 may be configured to handle user plane functionality (i.e., Central Unit-User Plane (CU-UP)), control plane functionality (i.e., Central Unit-Control Plane (CU-CP)), or a combination thereof. In some implementations, the CU 280 can be logically split into one or more CU-UP units and one or more CU-CP units. The CU-UP unit can communicate bidirectionally with the CU-CP unit via an interface, such as the E1 interface when implemented in an O-RAN configuration. The CU 280 can be implemented to communicate with the DU 285, as necessary, for network control and signaling.

The DU 285 may correspond to a logical unit that includes one or more base station functions to control the operation of one or more RUs 287. In some aspects, the DU 285 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 285 may further host one or more low PHY layers. Each layer (or module) can be implemented with an interface configured to communicate signals with other layers (and modules) hosted by the DU 285, or with the control functions hosted by the CU 280.

Lower-layer functionality can be implemented by one or more RUs 287. In some deployments, an RU 287, controlled by a DU 285, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 287 can be implemented to handle over the air (OTA) communication with one or more UEs 204. In some implementations, real-time and non-real-time aspects of control and user plane communication with the RU(s) 287 can be controlled by the corresponding DU 285. In some scenarios, this configuration can enable the DU(s) 285 and the CU 280 to be implemented in a cloud-based RAN architecture, such as a vRAN architecture.

The SMO Framework 255 may be configured to support RAN deployment and provisioning of non-virtualized and virtualized network elements. For non-virtualized network elements, the SMO Framework 255 may be configured to support the deployment of dedicated physical resources for RAN coverage requirements which may be managed via an operations and maintenance interface (such as an O1 interface). For virtualized network elements, the SMO Framework 255 may be configured to interact with a cloud computing platform (such as an open cloud (O-Cloud) 269) to perform network element life cycle management (such as to instantiate virtualized network elements) via a cloud computing platform interface (such as an O2 interface). Such virtualized network elements can include, but are not limited to, CUs 280, DUs 285, RUs 287 and Near-RT RICs 259. In some implementations, the SMO Framework 255 can communicate with a hardware aspect of a 4G RAN, such as an open eNB (O-eNB) 261, via an O1 interface. Additionally, in some implementations, the SMO Framework 255 can communicate directly with one or more RUs 287 via an O1 interface. The SMO Framework 255 also may include a Non-RT RIC 257 configured to support functionality of the SMO Framework 255.

The Non-RT RIC 257 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 259. The Non-RT RIC 257 may be coupled to or communicate with (such as via an A1 interface) the Near-RT RIC 259. The Near-RT RIC 259 may be configured to include a logical function that enables near-real-time control and optimization of RAN elements and resources via data collection and actions over an interface (such as via an E2 interface) connecting one or more CUs 280, one or more DUs 285, or both, as well as an O-eNB, with the Near-RT RIC 259.

In some implementations, to generate AI/ML models to be deployed in the Near-RT RIC 259, the Non-RT RIC 257 may receive parameters or external enrichment information from external servers. Such information may be utilized by the Near-RT RIC 259 and may be received at the SMO Framework 255 or the Non-RT RIC 257 from non-network data sources or from network functions. In some examples, the Non-RT RIC 257 or the Near-RT RIC 259 may be configured to tune RAN behavior or performance. For example, the Non-RT RIC 257 may monitor long-term trends and patterns for performance and employ AI/ML models to perform corrective actions through the SMO Framework 255 (such as reconfiguration via O1) or via creation of RAN management policies (such as A1 policies).

Figure 3A:
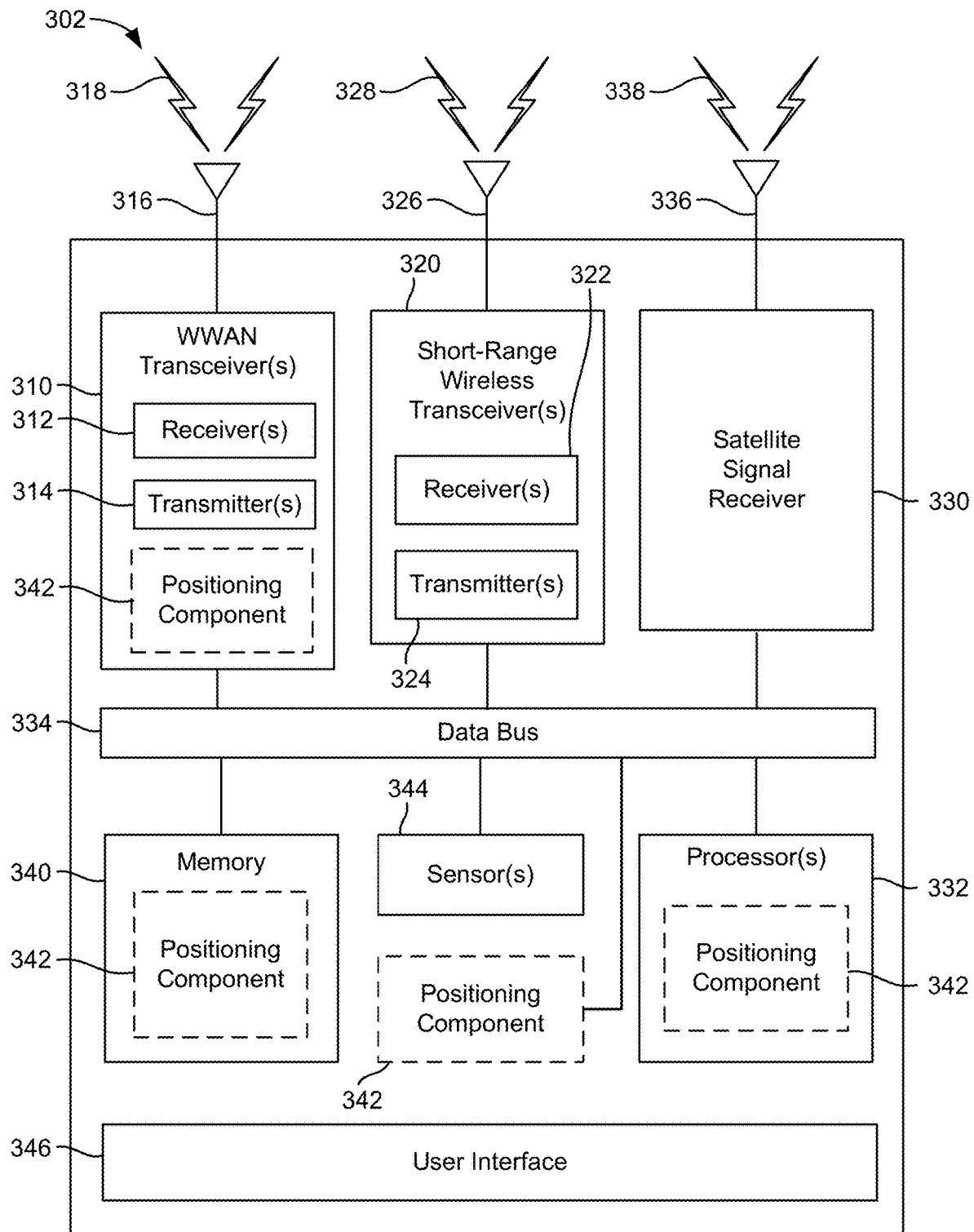
FIGS. 3A, 3B, and 3C are simplified block diagrams of several sample aspects of components that may be employed in a user equipment (UE), a base station, and a network entity, respectively, and configured to support communications as taught herein.
Figure 3B:
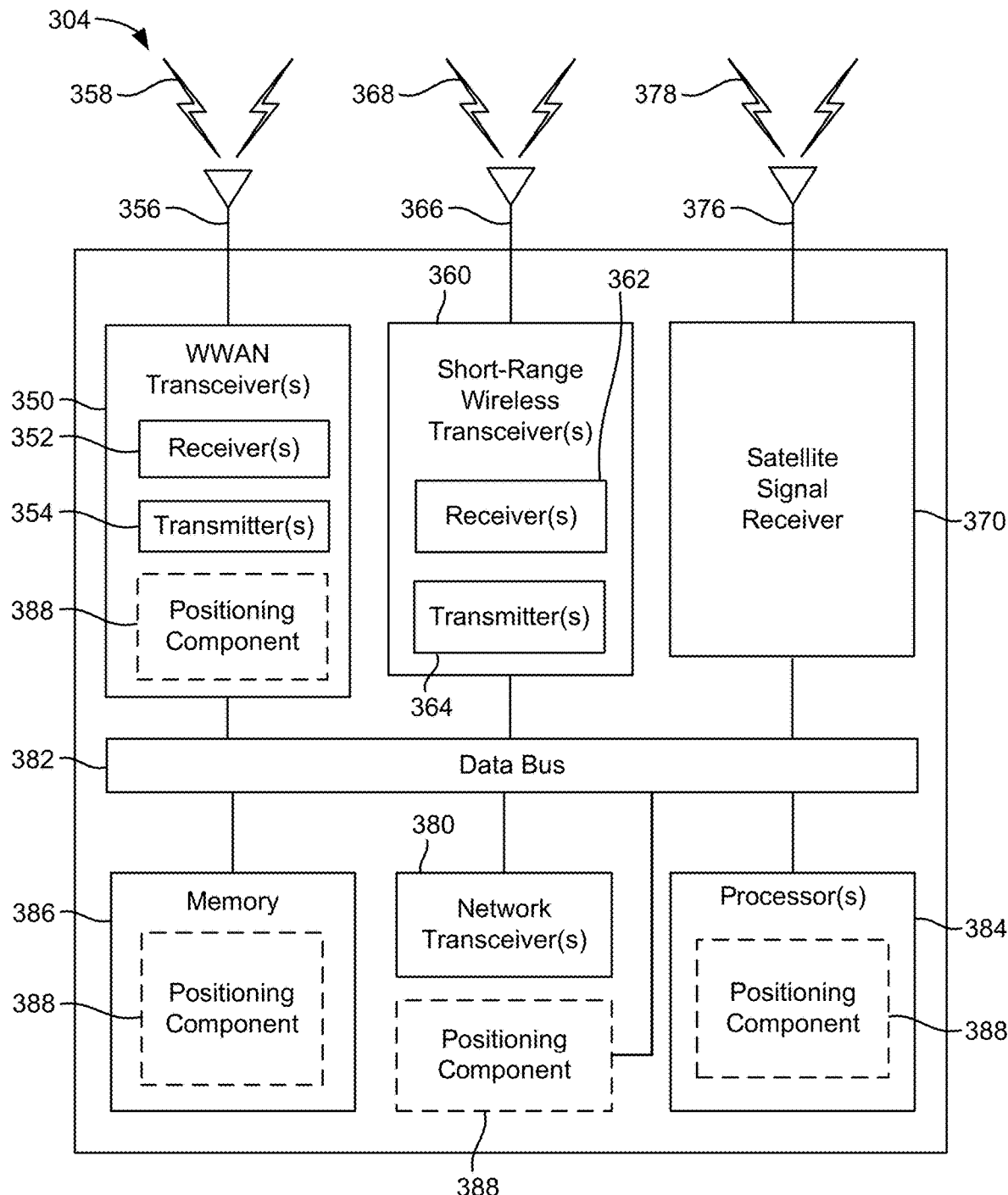
Figure 3C:
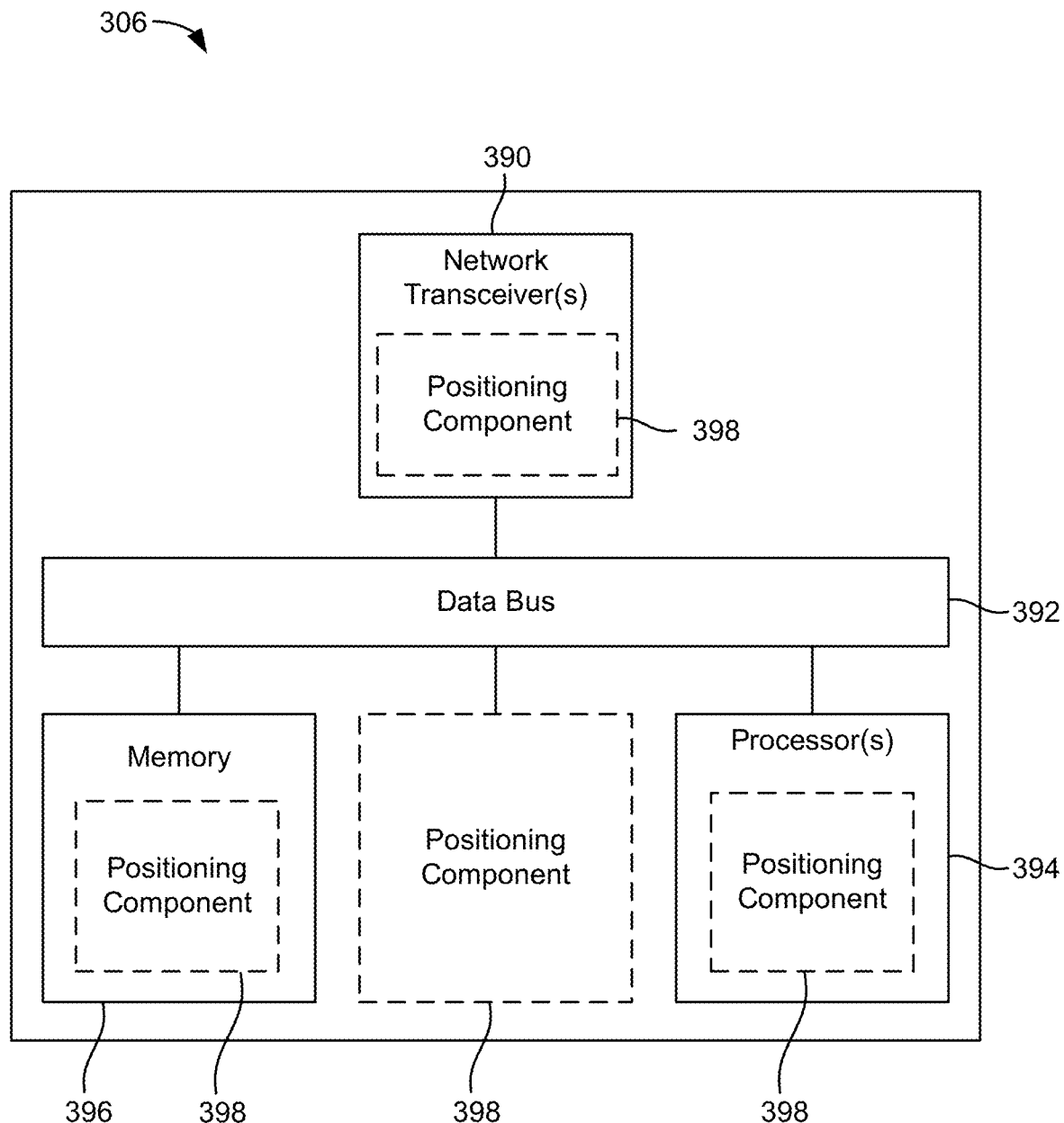

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270, or alternatively may be independent from the NG-RAN 220 and/or 5GC 210/260 infrastructure depicted in FIGS. 2A and 2B, such as a private network) to support the operations described herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include one or more wireless wide area network (WWAN) transceivers 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may each be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 each also include, at least in some cases, one or more short-range wireless transceivers 320 and 360, respectively. The short-range wireless transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, Zigbee®, Z-Wave®, PC5, dedicated short-range communications (DSRC), wireless access for vehicular environments (WAVE), near-field communication (NFC), ultra-wideband (UWB), etc.) over a wireless communication medium of interest. The short-range wireless transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the short-range wireless transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively. As specific examples, the short-range wireless transceivers 320 and 360 may be WiFi transceivers, Bluetooth® transceivers, Zigbee® and/or Z-Wave® transceivers, NFC transceivers, UWB transceivers, or vehicle-to-vehicle (V2V) and/or vehicle-to-everything (V2X) transceivers.

The UE 302 and the base station 304 also include, at least in some cases, satellite signal receivers 330 and 370. The satellite signal receivers 330 and 370 may be connected to one or more antennas 336 and 376, respectively, and may provide means for receiving and/or measuring satellite positioning/communication signals 338 and 378, respectively. Where the satellite signal receivers 330 and 370 are satellite positioning system receivers, the satellite positioning/communication signals 338 and 378 may be global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. Where the satellite signal receivers 330 and 370 are non-terrestrial network (NTN) receivers, the satellite positioning/communication signals 338 and 378 may be communication signals (e.g., carrying control and/or user data) originating from a 5G network. The satellite signal receivers 330 and 370 may comprise any suitable hardware and/or software for receiving and processing satellite positioning/communication signals 338 and 378, respectively. The satellite signal receivers 330 and 370 may request information and operations as appropriate from the other systems, and, at least in some cases, perform calculations to determine locations of the UE 302 and the base station 304, respectively, using measurements obtained by any suitable satellite positioning system algorithm.

The base station 304 and the network entity 306 each include one or more network transceivers 380 and 390, respectively, providing means for communicating (e.g., means for transmitting, means for receiving, etc.) with other network entities (e.g., other base stations 304, other network entities 306). For example, the base station 304 may employ the one or more network transceivers 380 to communicate with other base stations 304 or network entities 306 over one or more wired or wireless backhaul links. As another example, the network entity 306 may employ the one or more network transceivers 390 to communicate with one or more base station 304 over one or more wired or wireless backhaul links, or with other network entities 306 over one or more wired or wireless core network interfaces.

A transceiver may be configured to communicate over a wired or wireless link. A transceiver (whether a wired transceiver or a wireless transceiver) includes transmitter circuitry (e.g., transmitters 314, 324, 354, 364) and receiver circuitry (e.g., receivers 312, 322, 352, 362). A transceiver may be an integrated device (e.g., embodying transmitter circuitry and receiver circuitry in a single device) in some implementations, may comprise separate transmitter circuitry and separate receiver circuitry in some implementations, or may be embodied in other ways in other implementations. The transmitter circuitry and receiver circuitry of a wired transceiver (e.g., network transceivers 380 and 390 in some implementations) may be coupled to one or more wired network interface ports. Wireless transmitter circuitry (e.g., transmitters 314, 324, 354, 364) may include or be coupled to a plurality of antennas (e.g., antennas 316, 326, 356, 366), such as an antenna array, that permits the respective apparatus (e.g., UE 302, base station 304) to perform transmit "beamforming," as described herein. Similarly, wireless receiver circuitry (e.g., receivers 312, 322, 352, 362) may include or be coupled to a plurality of antennas (e.g., antennas 316, 326, 356, 366), such as an antenna array, that permits the respective apparatus (e.g., UE 302, base station 304) to perform receive beamforming, as described herein. In an aspect, the transmitter circuitry and receiver circuitry may share the same plurality of antennas (e.g., antennas 316, 326, 356, 366), such that the respective apparatus can only receive or transmit at a given time, not both at the same time. A wireless transceiver (e.g., WWAN transceivers 310 and 350, short-range wireless transceivers 320 and 360) may also include a network listen module (NLM) or the like for performing various measurements.

As used herein, the various wireless transceivers (e.g., transceivers 310, 320, 350, and 360, and network transceivers 380 and 390 in some implementations) and wired transceivers (e.g., network transceivers 380 and 390 in some implementations) may generally be characterized as "a transceiver," "at least one transceiver," or "one or more transceivers." As such, whether a particular transceiver is a wired or wireless transceiver may be inferred from the type of communication performed. For example, backhaul communication between network devices or servers will generally relate to signaling via a wired transceiver, whereas wireless communication between a UE (e.g., UE 302) and a base station (e.g., base station 304) will generally relate to signaling via a wireless transceiver.

The UE 302, the base station 304, and the network entity 306 also include other components that may be used in conjunction with the operations as disclosed herein. The UE 302, the base station 304, and the network entity 306 include one or more processors 332, 384, and 394, respectively, for providing functionality relating to, for example, wireless communication, and for providing other processing functionality. The processors 332, 384, and 394 may therefore provide means for processing, such as means for determining, means for calculating, means for receiving, means for transmitting, means for indicating, etc. In an aspect, the processors 332, 384, and 394 may include, for example, one or more general purpose processors, multi-core processors, central processing units (CPUs), ASICs, digital signal processors (DSPs), field programmable gate arrays (FPGAs), other programmable logic devices or processing circuitry, or various combinations thereof.

The UE 302, the base station 304, and the network entity 306 include memory circuitry implementing memories 340, 386, and 396 (e.g., each including a memory device), respectively, for maintaining information (e.g., information indicative of reserved resources, thresholds, parameters, and so on). The memories 340, 386, and 396 may therefore provide means for storing, means for retrieving, means for maintaining, etc. In some cases, the UE 302, the base station 304, and the network entity 306 may include positioning component 342, 388, and 398, respectively. The positioning component 342, 388, and 398 may be hardware circuits that are part of or coupled to the processors 332, 384, and 394, respectively, that, when executed, cause the UE 302, the base station 304, and the network entity 306 to perform the functionality described herein. In other aspects, the positioning component 342, 388, and 398 may be external to the processors 332, 384, and 394 (e.g., part of a modem processing system, integrated with another processing system, etc.). Alternatively, the positioning component 342, 388, and 398 may be memory modules stored in the memories 340, 386, and 396, respectively, that, when executed by the processors 332, 384, and 394 (or a modem processing system, another processing system, etc.), cause the UE 302, the base station 304, and the network entity 306 to perform the functionality described herein. FIG. 3A illustrates possible locations of the positioning component 342, which may be, for example, part of the one or more WWAN transceivers 310, the memory 340, the one or more processors 332, or any combination thereof, or may be a standalone component. FIG. 3B illustrates possible locations of the positioning component 388, which may be, for example, part of the one or more WWAN transceivers 350, the memory 386, the one or more processors 384, or any combination thereof, or may be a standalone component. FIG. 3C illustrates possible locations of the positioning component 398, which may be, for example, part of the one or more network transceivers 390, the memory 396, the one or more processors 394, or any combination thereof, or may be a standalone component.

The UE 302 may include one or more sensors 344 coupled to the one or more processors 332 to provide means for sensing or detecting movement and/or orientation information that is independent of motion data derived from signals received by the one or more WWAN transceivers 310, the one or more short-range wireless transceivers 320, and/or the satellite signal receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in two-dimensional (2D) and/or three-dimensional (3D) coordinate systems.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the one or more processors 384 in more detail, in the downlink, IP packets from the network entity 306 may be provided to the processor 384. The one or more processors 384 may implement functionality for an RRC layer, a packet data convergence protocol (PDCP) layer, a radio link control (RLC) layer, and a medium access control (MAC) layer. The one or more processors 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the one or more processors 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the one or more processors 332, which implements Layer-3 (L3) and Layer-2 (L2) functionality.

In the downlink, the one or more processors 332 provides demultiplexing between transport and logical channels, packet reassembly, deciphering, header decompression, and control signal processing to recover IP packets from the core network. The one or more processors 332 are also responsible for error detection.

Similar to the functionality described in connection with the downlink transmission by the base station 304, the one or more processors 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARQ), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the one or more processors 384.

In the uplink, the one or more processors 384 provides demultiplexing between transport and logical channels, packet reassembly, deciphering, header decompression, control signal processing to recover IP packets from the UE 302. IP packets from the one or more processors 384 may be provided to the core network. The one or more processors 384 are also responsible for error detection.

For convenience, the UE 302, the base station 304, and/or the network entity 306 are shown in FIGS. 3A, 3B, and 3C as including various components that may be configured according to the various examples described herein. It will be appreciated, however, that the illustrated components may have different functionality in different designs. In particular, various components in FIGS. 3A to 3C are optional in alternative configurations and the various aspects include configurations that may vary due to design choice, costs, use of the device, or other considerations. For example, in case of FIG. 3A, a particular implementation of UE 302 may omit the WWAN transceiver(s) 310 (e.g., a wearable device or tablet computer or PC or laptop may have Wi-Fi and/or Bluetooth capability without cellular capability), or may omit the short-range wireless transceiver(s) 320 (e.g., cellular-only, etc.), or may omit the satellite signal receiver 330, or may omit the sensor(s) 344, and so on. In another example, in case of FIG. 3B, a particular implementation of the base station 304 may omit the WWAN transceiver(s) 350 (e.g., a Wi-Fi "hotspot" access point without cellular capability), or may omit the short-range wireless transceiver(s) 360 (e.g., cellular-only, etc.), or may omit the satellite signal receiver 370, and so on. For brevity, illustration of the various alternative configurations is not provided herein, but would be readily understandable to one skilled in the art.

The various components of the UE 302, the base station 304, and the network entity 306 may be communicatively coupled to each other over data buses 334, 382, and 392, respectively. In an aspect, the data buses 334, 382, and 392 may form, or be part of, a communication interface of the UE 302, the base station 304, and the network entity 306, respectively. For example, where different logical entities are embodied in the same device (e.g., gNB and location server functionality incorporated into the same base station 304), the data buses 334, 382, and 392 may provide communication between them.

The components of FIGS. 3A, 3B, and 3C may be implemented in various ways. In some implementations, the components of FIGS. 3A, 3B, and 3C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 302, base station 304, network entity 306, etc., such as the processors 332, 384, 394, the transceivers 310, 320, 350, and 360, the memories 340, 386, and 396, the positioning component 342, 388, and 398, etc.

In some designs, the network entity 306 may be implemented as a core network component. In other designs, the network entity 306 may be distinct from a network operator or operation of the cellular network infrastructure (e.g., NG RAN 220 and/or 5GC 210/260). For example, the network entity 306 may be a component of a private network that may be configured to communicate with the UE 302 via the base station 304 or independently from the base station 304 (e.g., over a non-cellular communication link, such as WiFi).

Figure 4:
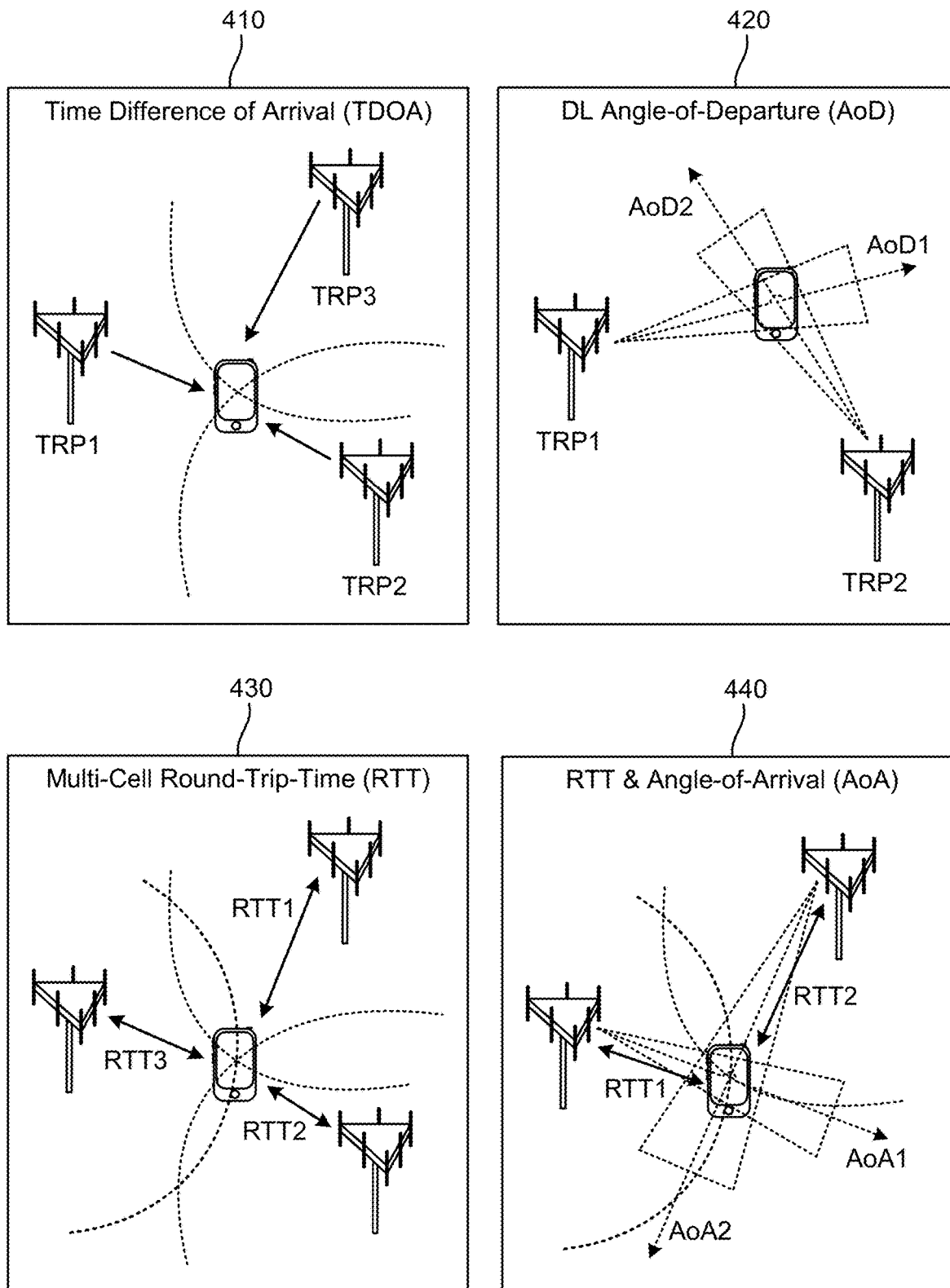
FIG. 4 illustrates examples of various positioning methods supported in New Radio (NR), according to aspects of the disclosure.

NR supports a number of cellular network-based positioning technologies, including downlink-based, uplink-based, and downlink-and-uplink-based positioning methods. Downlink-based positioning methods include observed time difference of arrival (OTDOA) in LTE, downlink time difference of arrival (DL-TDOA) in NR, and downlink angle-of-departure (DL-AoD) in NR. FIG. 4 illustrates examples of various positioning methods, according to aspects of the disclosure. In an OTDOA or DL-TDOA positioning procedure, illustrated by scenario 410, a UE measures the differences between the times of arrival (ToAs) of reference signals (e.g., positioning reference signals (PRS)) received from pairs of base stations, referred to as reference signal time difference (RSTD) or time difference of arrival (TDOA) measurements, and reports them to a positioning entity. More specifically, the UE receives the identifiers (IDs) of a reference base station (e.g., a serving base station) and multiple non-reference base stations in assistance data. The UE then measures the RSTD between the reference base station and each of the non-reference base stations. Based on the known locations of the involved base stations and the RSTD measurements, the positioning entity (e.g., the UE for UE-based positioning or a location server for UE-assisted positioning) can estimate the UE's location.

For DL-AoD positioning, illustrated by scenario 420, the positioning entity uses a measurement report from the UE of received signal strength measurements of multiple downlink transmit beams to determine the angle(s) between the UE and the transmitting base station(s). The positioning entity can then estimate the location of the UE based on the determined angle(s) and the known location(s) of the transmitting base station(s).

Uplink-based positioning methods include uplink time difference of arrival (UL-TDOA) and uplink angle-of-arrival (UL-AoA). UL-TDOA is similar to DL-TDOA, but is based on uplink reference signals (e.g., sounding reference signals (SRS)) transmitted by the UE to multiple base stations. Specifically, a UE transmits one or more uplink reference signals that are measured by a reference base station and a plurality of non-reference base stations. Each base station then reports the reception time (referred to as the relative time of arrival (RTOA)) of the reference signal(s) to a positioning entity (e.g., a location server) that knows the locations and relative timing of the involved base stations. Based on the reception-to-reception (Rx-Rx) time difference between the reported RTOA of the reference base station and the reported RTOA of each non-reference base station, the known locations of the base stations, and their known timing offsets, the positioning entity can estimate the location of the UE using TDOA.

For UL-AoA positioning, one or more base stations measure the received signal strength of one or more uplink reference signals (e.g., SRS) received from a UE on one or more uplink receive beams. The positioning entity uses the signal strength measurements and the angle(s) of the receive beam(s) to determine the angle(s) between the UE and the base station(s). Based on the determined angle(s) and the known location(s) of the base station(s), the positioning entity can then estimate the location of the UE.

Downlink-and-uplink-based positioning methods include enhanced cell-ID (E-CID) positioning and multi-round-trip-time (RTT) positioning (also referred to as "multi-cell RTT" and "multi-RTT"). In an RTT procedure, a first entity (e.g., a base station or a UE) transmits a first RTT-related signal (e.g., a PRS or SRS) to a second entity (e.g., a UE or base station), which transmits a second RTT-related signal (e.g., an SRS or PRS) back to the first entity. Each entity measures the time difference between the time of arrival (ToA) of the received RTT-related signal and the transmission time of the transmitted RTT-related signal. This time difference is referred to as a reception-to-transmission (Rx-Tx) time difference. The Rx-Tx time difference measurement may be made, or may be adjusted, to include only a time difference between nearest slot boundaries for the received and transmitted signals. Both entities may then send their Rx-Tx time difference measurement to a location server (e.g., an LMF 270), which calculates the round trip propagation time (i.e., RTT) between the two entities from the two Rx-Tx time difference measurements (e.g., as the sum of the two Rx-Tx time difference measurements). Alternatively, one entity may send its Rx-Tx time difference measurement to the other entity, which then calculates the RTT. The distance between the two entities can be determined from the RTT and the known signal speed (e.g., the speed of light). For multi-RTT positioning, illustrated by scenario 430, a first entity (e.g., a UE or base station) performs an RTT positioning procedure with multiple second entities (e.g., multiple base stations or UEs) to enable the location of the first entity to be determined (e.g., using multilateration) based on distances to, and the known locations of, the second entities. RTT and multi-RTT methods can be combined with other positioning techniques, such as UL-AoA and DL-AoD, to improve location accuracy, as illustrated by scenario 440.

The E-CID positioning method is based on radio resource management (RRM) measurements. In E-CID, the UE reports the serving cell ID, the timing advance (TA), and the identifiers, estimated timing, and signal strength of detected neighbor base stations. The location of the UE is then estimated based on this information and the known locations of the base station(s).

To assist positioning operations, a location server (e.g., location server 230, LMF 270, SLP 272) may provide assistance data to the UE via, for example, one or more LTE positioning protocol (LPP) messages. For example, the assistance data may include identifiers of the base stations (or the cells/TRPs of the base stations) from which to measure reference signals, the reference signal configuration parameters (e.g., the number of consecutive slots including PRS, periodicity of the consecutive slots including PRS, muting sequence, frequency hopping sequence, reference signal identifier, reference signal bandwidth, etc.), and/or other parameters applicable to the particular positioning method. Alternatively, the assistance data may originate directly from the base stations themselves (e.g., in periodically broadcasted overhead messages, etc.). In some cases, the UE may be able to detect neighbor network nodes itself without the use of assistance data.

In the case of an OTDOA or DL-TDOA positioning procedure, the assistance data may further include an expected RSTD value and an associated uncertainty, or search window, around the expected RSTD. In some cases, the value range of the expected RSTD may be +/−500 microseconds (µs). In some cases, when any of the resources used for the positioning measurement are in FR1, the value range for the uncertainty of the expected RSTD may be +/−32 µs. In other cases, when all of the resources used for the positioning measurement(s) are in FR2, the value range for the uncertainty of the expected RSTD may be +/−8 µs.

A location estimate may be referred to by other names, such as a position estimate, location, position, position fix, fix, or the like. A location estimate may be geodetic and comprise coordinates (e.g., latitude, longitude, and possibly altitude) or may be civic and comprise a street address, postal address, or some other verbal description of a location. A location estimate may further be defined relative to some other known location or defined in absolute terms (e.g., using latitude, longitude, and possibly altitude). A location estimate may include an expected error or uncertainty (e.g., by including an area or volume within which the location is expected to be included with some specified or default level of confidence).

LPP is used point-to-point between a location server (e.g., LMF 270) and a target device (e.g., a UE) in order to position the target device using position-related measurements obtained by one or more reference sources (physical entities or parts of physical entities that provide signals that can be measured by a target device in order to obtain the location of the target device). An LPP session is used between a location server and a target device in order to obtain location-related measurements or a location estimate or to transfer assistance data. Currently, a single LPP session is used to support a single location request and multiple LPP sessions can be used between the same endpoints to support multiple different location requests. Each LPP session comprises one or more LPP transactions (or procedures), with each LPP transaction performing a single operation (capability exchange, assistance data transfer, or location information transfer). Each LPP transaction involves the exchange of one or more LPP messages between the location server and the target device.

An LPP session generally includes at least a capability transfer or indication procedure, an assistance data transfer or delivery procedure, and a location information transfer or delivery procedure. FIG. 5 illustrates an example LPP capability transfer procedure 510, LPP assistance data transfer procedure 530, and LPP location information transfer procedure 550 between a target device (labeled "Target") and a location server (labeled "Server"), according to aspects of the disclosure.

The purpose of an LPP capability transfer procedure 510 is to enable the transfer of capabilities from the target device (e.g., a UE 204) to the location server (e.g., an LMF 270). Capabilities in this context refer to positioning and protocol capabilities related to LPP and the positioning methods supported by LPP. In the LPP capability transfer procedure 510, the location server (e.g., an LMF 270) indicates the types of capabilities needed from the target device (e.g., UE 204) in an LPP Request Capabilities message. The target device responds with an LPP Provide Capabilities message. The capabilities included in the LPP Provide Capabilities message should correspond to any capability types specified in the LPP Request Capabilities message. Specifically, for each positioning method for which a request for capabilities is included in the LPP Request Capabilities message, if the target device supports this positioning method, the target device includes the capabilities of the target device for that supported positioning method in the LPP Provide Capabilities message. For an LPP capability indication procedure, the target device provides unsolicited (i.e., without receiving an LPP Request Capabilities message) capabilities to the location server in an LPP Provide Capabilities message.

The purpose of an LPP assistance data transfer procedure 530 is to enable the target device to request assistance data from the location server to assist in positioning, and to enable the location server to transfer assistance data to the target device in the absence of a request. In the LPP assistance data transfer procedure 530, the target device sends an LPP Request Assistance Data message to the location server. The location server responds to the target device with an LPP Provide Assistance Data message containing assistance data. The transferred assistance data should match or be a subset of the assistance data requested in the LPP Request Assistance Data. The location server may also provide any not requested information that it considers useful to the target device. The location server may also transmit one or more additional LPP Provide Assistance Data messages to the target device containing further assistance data. For an LPP assistance data delivery procedure, the location server provides unsolicited assistance data necessary for positioning. The assistance data may be provided periodically or non-periodically.

The purpose of an LPP location information transfer procedure 550 is to enable the location server to request location measurement data and/or a location estimate from the target device, and to enable the target device to transfer location measurement data and/or a location estimate to a location server in the absence of a request. In an LPP location information transfer procedure 550, the location server sends an LPP Request Location Information message to the target device to request location information, indicating the type of location information needed and potentially the associated QoS. The target device responds with an LPP Provide Location Information message to the location server to transfer location information. The location information transferred should match or be a subset of the location information requested by the LPP Request Location Information unless the location server explicitly allows additional location information. More specifically, if the requested information is compatible with the target device's capabilities and configuration, the target device includes the requested information in an LPP Provide Location Information message. Otherwise, if the target device does not support one or more of the requested positioning methods, the target device continues to process the message as if it contained only information for the supported positioning methods and handles the signaling content of the unsupported positioning methods by LPP error detection. If requested by the LPP Request Lactation Information message, the target device sends additional LPP Provide Location Information messages to the location server to transfer additional location information. An LPP location information delivery procedure supports the delivery of positioning estimations based on unsolicited service.

Figure 6:
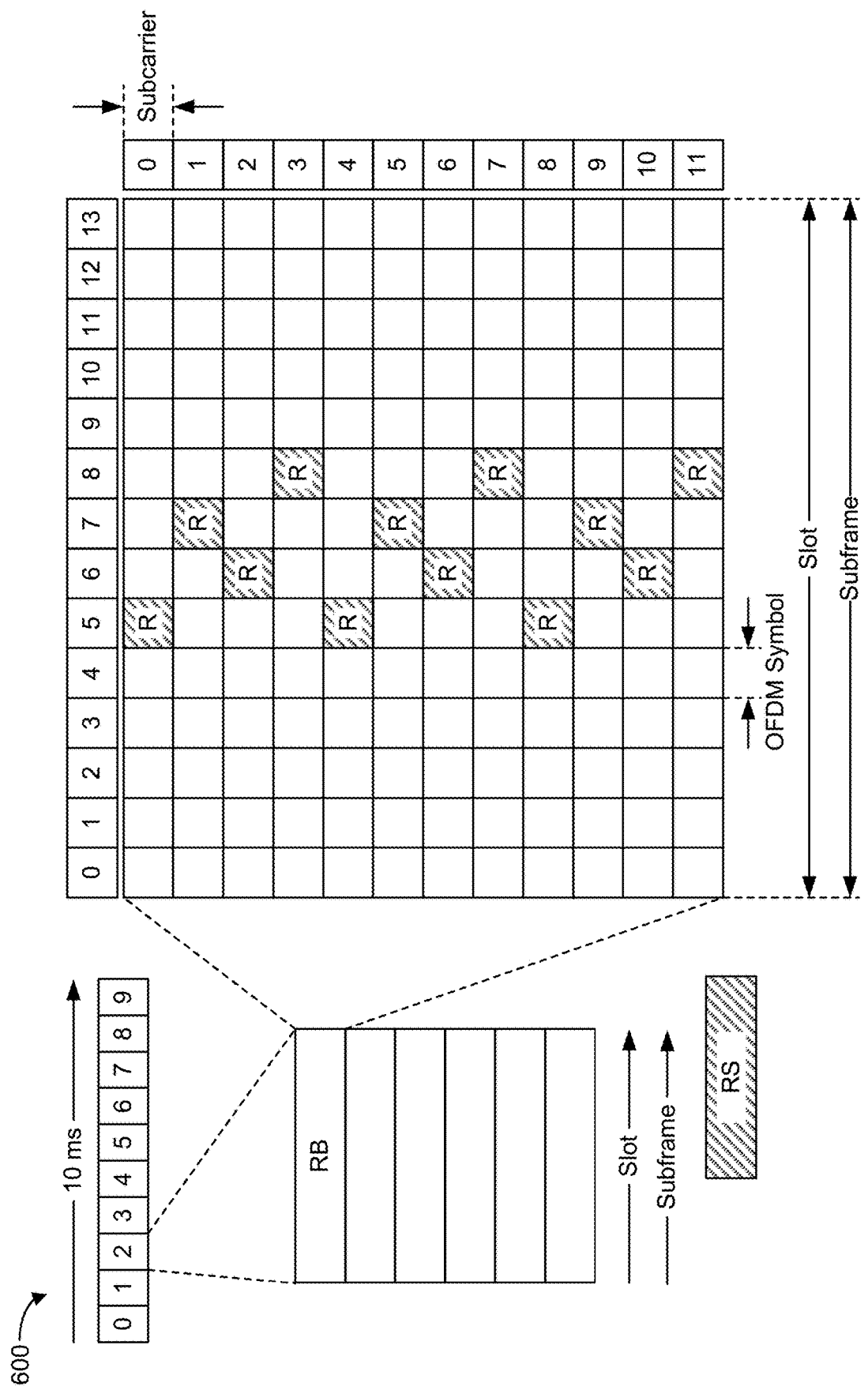
FIG. 6 is a diagram illustrating an example frame structure, according to aspects of the disclosure.

Various frame structures may be used to support downlink and uplink transmissions between network nodes (e.g., base stations and UEs). FIG. 6 is a diagram 600 illustrating an example frame structure, according to aspects of the disclosure. The frame structure may be a downlink or uplink frame structure. Other wireless communications technologies may have different frame structures and/or different channels.

LTE, and in some cases NR, utilizes orthogonal frequency-division multiplexing (OFDM) on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kilohertz (kHz) and the minimum resource allocation (resource block) may be 12 subcarriers (or 180 kHz). Consequently, the nominal fast Fourier transform (FFT) size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing (SCS), symbol length, etc.). In contrast, NR may support multiple numerologies ($\mu$), for example, subcarrier spacings of 15 kHz ($\mu=0$), 30 kHz ($\mu=1$), 60 kHz ($\mu=2$), 120 kHz ($\mu=3$), and 240 kHz ($\mu=4$) or greater may be available. In each subcarrier spacing, there are 14 symbols per slot. For 15 kHz SCS ($\mu=0$), there is one slot per subframe, 10 slots per frame, the slot duration is 1 millisecond (ms), the symbol duration is 66.7 microseconds ($\mu s$), and the maximum nominal system bandwidth (in MHz) with a 4K FFT size is 50. For 30 kHz SCS ($\mu=1$), there are two slots per subframe, 20 slots per frame, the slot duration is 0.5 ms, the symbol duration is 33.3 $\mu s$, and the maximum nominal system bandwidth (in MHz) with a 4K FFT size is 100. For 60 kHz SCS ($\mu=2$), there are four slots per subframe, 40 slots per frame, the slot duration is 0.25 ms, the symbol duration is 16.7 $\mu s$, and the maximum nominal system bandwidth (in MHz) with a 4K FFT size is 200. For 120 kHz SCS ($\mu=3$), there are eight slots per subframe, 80 slots per frame, the slot duration is 0.125 ms, the symbol duration is 8.33 $\mu s$, and the maximum nominal system bandwidth (in MHz) with a 4K FFT size is 400. For 240 kHz SCS ($\mu=4$), there are 16 slots per subframe, 160 slots per frame, the slot duration is 0.0625 ms, the symbol duration is 4.17 μs, and the maximum nominal system bandwidth (in MHz) with a 4K FFT size is 800.

In the example of FIG. 6, a numerology of 15 kHz is used. Thus, in the time domain, a 10 ms frame is divided into 10 equally sized subframes of 1 ms each, and each subframe includes one time slot. In FIG. 6, time is represented horizontally (on the X axis) with time increasing from left to right, while frequency is represented vertically (on the Y axis) with frequency increasing (or decreasing) from bottom to top.

A resource grid may be used to represent time slots, each time slot including one or more time-concurrent resource blocks (RBs) (also referred to as physical RBs (PRBs)) in the frequency domain. The resource grid is further divided into multiple resource elements (REs). An RE may correspond to one symbol length in the time domain and one subcarrier in the frequency domain. In the numerology of FIG. 6, for a normal cyclic prefix, an RB may contain 12 consecutive subcarriers in the frequency domain and seven consecutive symbols in the time domain, for a total of 84 REs. For an extended cyclic prefix, an RB may contain 12 consecutive subcarriers in the frequency domain and six consecutive symbols in the time domain, for a total of 72 REs. The number of bits carried by each RE depends on the modulation scheme.

Some of the REs may carry reference (pilot) signals (RS). The reference signals may include positioning reference signals (PRS), tracking reference signals (TRS), phase tracking reference signals (PTRS), cell-specific reference signals (CRS), channel state information reference signals (CSI-RS), demodulation reference signals (DMRS), primary synchronization signals (PSS), secondary synchronization signals (SSS), synchronization signal blocks (SSBs), sounding reference signals (SRS), etc., depending on whether the illustrated frame structure is used for uplink or downlink communication. FIG. 6 illustrates example locations of REs carrying a reference signal (labeled "R").

A collection of resource elements (REs) that are used for transmission of PRS is referred to as a "PRS resource." The collection of resource elements can span multiple PRBs in the frequency domain and 'N' (such as 1 or more) consecutive symbol(s) within a slot in the time domain. In a given OFDM symbol in the time domain, a PRS resource occupies consecutive PRBs in the frequency domain.

The transmission of a PRS resource within a given PRB has a particular comb size (also referred to as the "comb density"). A comb size 'N' represents the subcarrier spacing (or frequency/tone spacing) within each symbol of a PRS resource configuration. Specifically, for a comb size 'N,' PRS are transmitted in every Nth subcarrier of a symbol of a PRB. For example, for comb-4, for each symbol of the PRS resource configuration, REs corresponding to every fourth subcarrier (such as subcarriers 0, 4, 8) are used to transmit PRS of the PRS resource. Currently, comb sizes of comb-2, comb-4, comb-6, and comb-12 are supported for DL-PRS. FIG. 6 illustrates an example PRS resource configuration for comb-4 (which spans four symbols). That is, the locations of the shaded REs (labeled "R") indicate a comb-4 PRS resource configuration.

Currently, a DL-PRS resource may span 2, 4, 6, or 12 consecutive symbols within a slot with a fully frequency-domain staggered pattern. A DL-PRS resource can be configured in any higher layer configured downlink or flexible (FL) symbol of a slot. There may be a constant energy per resource element (EPRE) for all REs of a given DL-PRS resource. The following are the frequency offsets from symbol to symbol for comb sizes 2, 4, 6, and 12 over 2, 4, 6, and 12 symbols. 2-symbol comb-2: {0, 1}; 4-symbol comb-2: {0, 1, 0, 1}; 6-symbol comb-2: {0, 1, 0, 1, 0, 1}; 12-symbol comb-2: {0, 1, 0, 1, 0, 1, 0, 1, 0, 1, 0, 1}; 4-symbol comb-4: {0, 2, 1, 3} (as in the example of FIG. 6); 12-symbol comb-4: {0, 2, 1, 3, 0, 2, 1, 3, 0, 2, 1, 3}; 6-symbol comb-6: {0, 3, 1, 4, 2, 5}; 12-symbol comb-6: {0, 3, 1, 4, 2, 5, 0, 3, 1, 4, 2, 5}; and 12-symbol comb-12: {0, 6, 3, 9, 1, 7, 4, 10, 2, 8, 5, 11}.

A "PRS resource set" is a set of PRS resources used for the transmission of PRS signals, where each PRS resource has a PRS resource ID. In addition, the PRS resources in a PRS resource set are associated with the same TRP. A PRS resource set is identified by a PRS resource set ID and is associated with a particular TRP (identified by a TRP ID). In addition, the PRS resources in a PRS resource set have the same periodicity, a common muting pattern configuration, and the same repetition factor (such as "PRS-ResourceRepetitionFactor") across slots. The periodicity is the time from the first repetition of the first PRS resource of a first PRS instance to the same first repetition of the same first PRS resource of the next PRS instance. The periodicity may have a length selected from $2^\mu * \{4, 5, 8, 10, 16, 20, 32, 40, 64, 80, 160, 320, 640, 1280, 2560, 5120, 10240\}$ slots, with $\mu=0, 1, 2, 3$. The repetition factor may have a length selected from $\{1, 2, 4, 6, 8, 16, 32\}$ slots.

A PRS resource ID in a PRS resource set is associated with a single beam (or beam ID) transmitted from a single TRP (where a TRP may transmit one or more beams). That is, each PRS resource of a PRS resource set may be transmitted on a different beam, and as such, a "PRS resource," or simply "resource," also can be referred to as a "beam." Note that this does not have any implications on whether the TRPs and the beams on which PRS are transmitted are known to the UE.

A "PRS instance" or "PRS occasion" is one instance of a periodically repeated time window (such as a group of one or more consecutive slots) where PRS are expected to be transmitted. A PRS occasion also may be referred to as a "PRS positioning occasion," a "PRS positioning instance, a "positioning occasion," "a positioning instance," a "positioning repetition," or simply an "occasion," an "instance," or a "repetition."

A "positioning frequency layer" (also referred to simply as a "frequency layer") is a collection of one or more PRS resource sets across one or more TRPs that have the same values for certain parameters. Specifically, the collection of PRS resource sets has the same subcarrier spacing and cyclic prefix (CP) type (meaning all numerologies supported for the physical downlink shared channel (PDSCH) are also supported for PRS), the same Point A, the same value of the downlink PRS bandwidth, the same start PRB (and center frequency), and the same comb-size. The Point A parameter takes the value of the parameter "ARFCN-ValueNR" (where "ARFCN" stands for "absolute radio-frequency channel number") and is an identifier/code that specifies a pair of physical radio channel used for transmission and reception. The downlink PRS bandwidth may have a granularity of four PRBs, with a minimum of 24 PRBs and a maximum of 272 PRBs. Currently, up to four frequency layers have been defined, and up to two PRS resource sets may be configured per TRP per frequency layer.

The concept of a frequency layer is somewhat like the concept of component carriers and bandwidth parts (BWPs), but different in that component carriers and BWPs are used by one base station (or a macro cell base station and a small cell base station) to transmit data channels, while frequency layers are used by several (usually three or more) base stations to transmit PRS. A UE may indicate the number of frequency layers it can support when it sends the network its positioning capabilities, such as during an LTE positioning protocol (LPP) session. For example, a UE may indicate whether it can support one or four positioning frequency layers.

Note that the terms "positioning reference signal" and "PRS" generally refer to specific reference signals that are used for positioning in NR and LTE systems. However, as used herein, the terms "positioning reference signal" and "PRS" may also refer to any type of reference signal that can be used for positioning, such as but not limited to, PRS as defined in LTE and NR, TRS, PTRS, CRS, CSI-RS, DMRS, PSS, SSS, SSB, SRS, UL-PRS, etc. In addition, the terms "positioning reference signal" and "PRS" may refer to downlink, uplink, or sidelink positioning reference signals, unless otherwise indicated by the context. If needed to further distinguish the type of PRS, a downlink positioning reference signal may be referred to as a "DL-PRS," an uplink positioning reference signal (e.g., an SRS-for-positioning, PTRS) may be referred to as an "UL-PRS," and a sidelink positioning reference signal may be referred to as an "SL-PRS." In addition, for signals that may be transmitted in the downlink, uplink, and/or sidelink (e.g., DMRS), the signals may be prepended with "DL," "UL," or "SL" to distinguish the direction. For example, "UL-DMRS" is different from "DL-DMRS."

Figure 7:
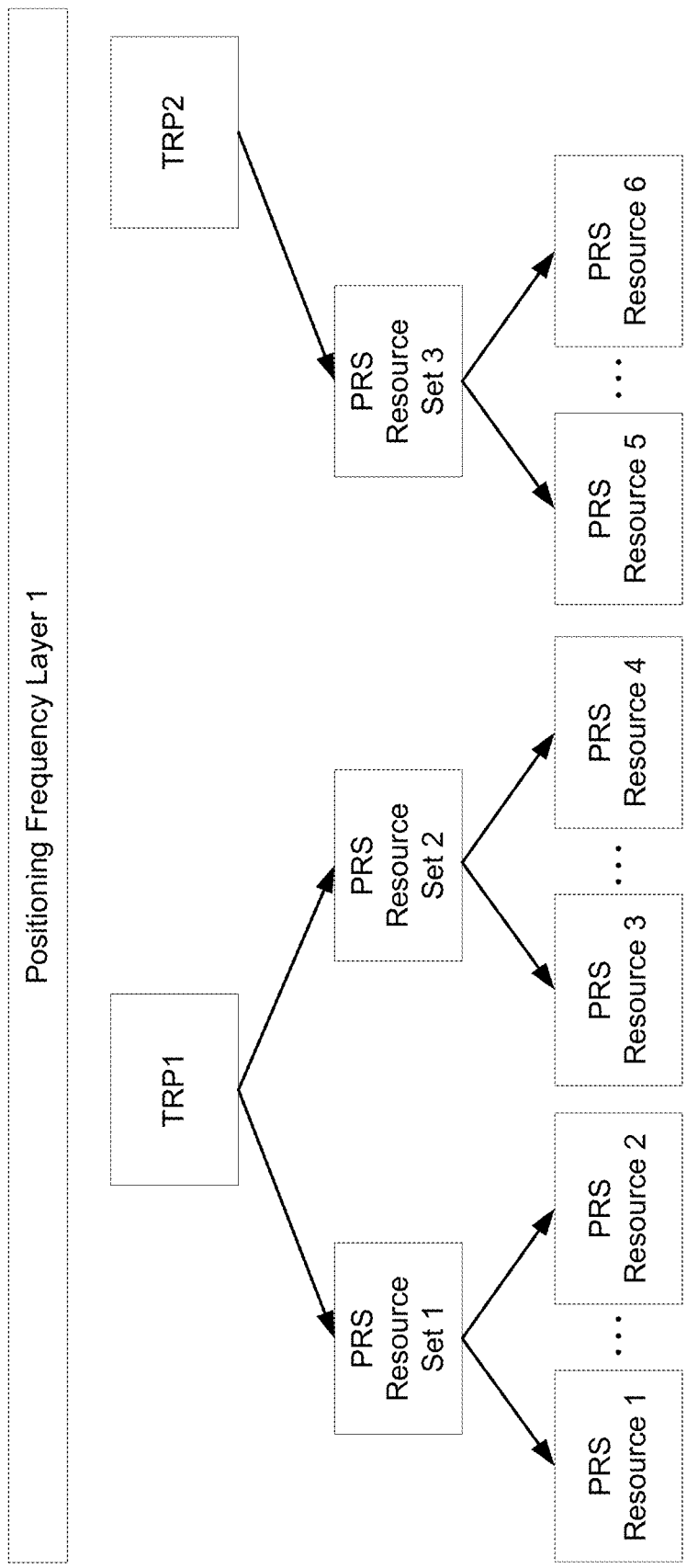
FIG. 7 is a diagram illustrating an example downlink positioning reference signal (DL-PRS) configuration for two transmission-reception points (TRPs) operating in the same positioning frequency layer, according to aspects of the disclosure.

FIG. 7 is a diagram 700 illustrating an example PRS configuration for two TRPs (labeled "TRP1" and "TRP2") operating in the same positioning frequency layer (labeled "Positioning Frequency Layer 1"), according to aspects of the disclosure. For a positioning session, a UE may be provided with assistance data indicating the illustrated PRS configuration. In the example of FIG. 7, the first TRP ("TRP1") is associated with (e.g., transmits) two PRS resource sets, labeled "PRS Resource Set 1" and "PRS Resource Set 2," and the second TRP ("TRP2") is associated with one PRS resource set, labeled "PRS Resource Set 3." Each PRS resource set comprises at least two PRS resources. Specifically, the first PRS resource set ("PRS Resource Set 1") includes PRS resources labeled "PRS Resource 1" and "PRS Resource 2," the second PRS resource set ("PRS Resource Set 2") includes PRS resources labeled "PRS Resource 3" and "PRS Resource 4," and the third PRS resource set ("PRS Resource Set 3") includes PRS resources labeled "PRS Resource 5" and "PRS Resource 6."

Figure 8A:
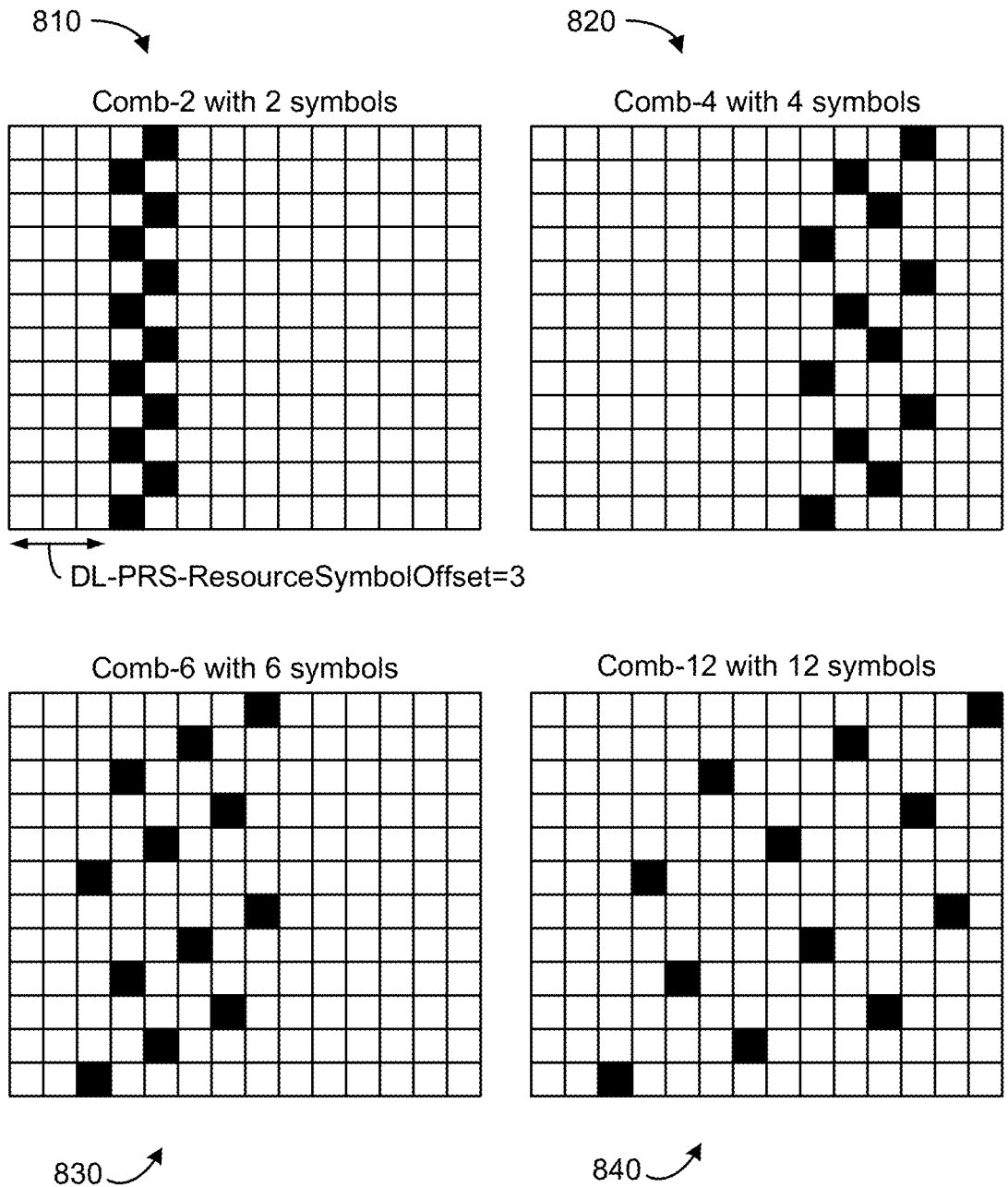

FIGS. 8A and 8B illustrate various comb patterns supported for DL-PRS within a resource block. In FIGS. 8A and 8B, time is represented horizontally and frequency is represented vertically. Each large block in FIGS. 8A and 8B represents a resource block and each small block represents a resource element. As discussed above, a resource element consists of one symbol in the time domain and one subcarrier in the frequency domain. In the example of FIGS. 8A and 8B, each resource block comprises 14 symbols in the time domain and 12 subcarriers in the frequency domain. The shaded resource elements carry, or are scheduled to carry, DL-PRS. As such, the shaded resource elements in each resource block correspond to a PRS resource, or the portion of the PRS resource within one resource block (since a PRS resource can span multiple resource blocks in the frequency domain).

The illustrated comb patterns correspond to various DL-PRS comb patterns described above. Specifically, FIG. 8A illustrates a DL-PRS comb pattern 810 for comb-2 with two symbols, a DL-PRS comb pattern 820 for comb-4 with four symbols, a DL-PRS comb pattern 830 for comb-6 with six symbols, and a DL-PRS comb pattern 840 for comb-12 with 12 symbols. FIG. 8B illustrates a DL-PRS comb pattern 850 for comb-2 with 12 symbols, a DL-PRS comb pattern 860 for comb-4 with 12 symbols, a DL-PRS comb pattern 870 for comb-2 with six symbols, and a DL-PRS comb pattern 880 for comb-6 with 12 symbols.

Note that in the example comb patterns of FIG. 8A, the resource elements on which the DL-PRS are transmitted are staggered in the frequency domain such that there is only one such resource element per subcarrier over the configured number of symbols. For example, for DL-PRS comb pattern 820, there is only one resource element per subcarrier over the four symbols. This is referred to as "frequency domain staggering."

Further, there is some DL-PRS resource symbol offset (given by the parameter "DL-PRS-ResourceSymbolOffset") from the first symbol of a resource block to the first symbol of the DL-PRS resource. In the example of DL-PRS comb pattern 810, the offset is three symbols. In the example of DL-PRS comb pattern 820, the offset is eight symbols. In the examples of DL-PRS comb patterns 830 and 840, the offset is two symbols. In the examples of DL-PRS comb pattern 850 to 880, the offset is two symbols.

As will be appreciated, a UE would need to have higher capabilities to measure the DL-PRS comb pattern 810 than to measure the DL-PRS comb pattern 820, as the UE would have to measure resource elements on twice as many subcarriers per symbol for DL-PRS comb pattern 810 as for DL-PRS comb pattern 820. In addition, a UE would need to have higher capabilities to measure the DL-PRS comb pattern 830 than to measure the DL-PRS comb pattern 840, as the UE will have to measure resource elements on twice as many subcarriers per symbol for DL-PRS comb pattern 830 as for DL-PRS comb pattern 840. Further, the UE would need to have higher capabilities to measure the DL-PRS comb patterns 810 and 820 than to measure the DL-PRS comb patterns 830 and 840, as the resource elements of DL-PRS comb patterns 810 and 820 are denser than the resource elements of DL-PRS comb patterns 830 and 840.

In an aspect, the reference signal carried on the REs labeled "R" in FIG. 6 may be SRS. SRS transmitted by a UE may be used by a base station to obtain the channel state information (CSI) for the transmitting UE. CSI describes how an RF signal propagates from the UE to the base station and represents the combined effect of scattering, fading, and power decay with distance. The system uses the SRS for resource scheduling, link adaptation, massive MIMO, beam management, etc.

A collection of REs that are used for transmission of SRS is referred to as an "SRS resource," and may be identified by the parameter "SRS-ResourceId." The collection of resource elements can span multiple PRBs in the frequency domain and 'N' (e.g., one or more) consecutive symbol(s) within a slot in the time domain. In a given OFDM symbol, an SRS resource occupies one or more consecutive PRBs. An "SRS resource set" is a set of SRS resources used for the transmission of SRS signals, and is identified by an SRS resource set ID ("SRS-ResourceSetId").

The transmission of SRS resources within a given PRB has a particular comb size (also referred to as the "comb density"). A comb size 'N' represents the subcarrier spacing (or frequency/tone spacing) within each symbol of an SRS resource configuration. Specifically, for a comb size 'N,' SRS are transmitted in every Nth subcarrier of a symbol of a PRB. For example, for comb-4, for each symbol of the SRS resource configuration, REs corresponding to every fourth subcarrier (such as subcarriers 0, 4, 8) are used to transmit SRS of the SRS resource. In the example of FIG. 6, the illustrated SRS is comb-4 over four symbols. That is, the locations of the shaded SRS REs indicate a comb-4 SRS resource configuration.

Currently, an SRS resource may span 1, 2, 4, 8, or 12 consecutive symbols within a slot with a comb size of comb-2, comb-4, or comb-8. The following are the frequency offsets from symbol to symbol for the SRS comb patterns that are currently supported. 1-symbol comb-2: {0}; 2-symbol comb-2: {0, 1}; 2-symbol comb-4: {0, 2}; 4-symbol comb-2: {0, 1, 0, 1}; 4-symbol comb-4: {0, 2, 1, 3} (as in the example of FIG. 6); 8-symbol comb-4: {0, 2, 1, 3, 0, 2, 1, 3}; 12-symbol comb-4: {0, 2, 1, 3, 0, 2, 1, 3, 0, 2, 1, 3}; 4-symbol comb-8: {0, 4, 2, 6}; 8-symbol comb-8: {0, 4, 2, 6, 1, 5, 3, 7}; and 12-symbol comb-8: {0, 4, 2, 6, 1, 5, 3, 7, 0, 4, 2, 6}.

Generally, as noted above, a UE transmits SRS to enable the receiving base station (either the serving base station or a neighboring base station) to measure the channel quality (i.e., CSI) between the UE and the base station. However, SRS can also be specifically configured as uplink positioning reference signals for uplink-based positioning procedures, such as uplink time difference of arrival (UL-TDOA), round-trip-time (RTT), uplink angle-of-arrival (UL-AoA), etc. As used herein, the term "SRS" may refer to SRS configured for channel quality measurements or SRS configured for positioning purposes. The former may be referred to herein as "SRS-for-communication" and/or the latter may be referred to as "SRS-for-positioning" or "positioning SRS" when needed to distinguish the two types of SRS.

Several enhancements over the previous definition of SRS have been proposed for SRS-for-positioning (also referred to as "UL-PRS"), such as a new staggered pattern within an SRS resource (except for single-symbol/comb-2), a new comb type for SRS, new sequences for SRS, a higher number of SRS resource sets per component carrier, and a higher number of SRS resources per component carrier. In addition, the parameters "SpatialRelationInfo" and "PathLossReference" are to be configured based on a downlink reference signal or SSB from a neighboring TRP. Further still, one SRS resource may be transmitted outside the active BWP, and one SRS resource may span across multiple component carriers. Also, SRS may be configured in RRC connected state and only transmitted within an active BWP. Further, there may be no frequency hopping, no repetition factor, a single antenna port, and new lengths for SRS (e.g., 8 and 12 symbols). There also may be open-loop power control and not closed-loop power control, and comb-8 (i.e., an SRS transmitted every eighth subcarrier in the same symbol) may be used. Lastly, the UE may transmit through the same transmit beam from multiple SRS resources for UL-AoA. All of these are features that are additional to the current SRS framework, which is configured through RRC higher layer signaling (and potentially triggered or activated through a MAC control element (MAC-CE) or downlink control information (DCI)).

Figure 9A:
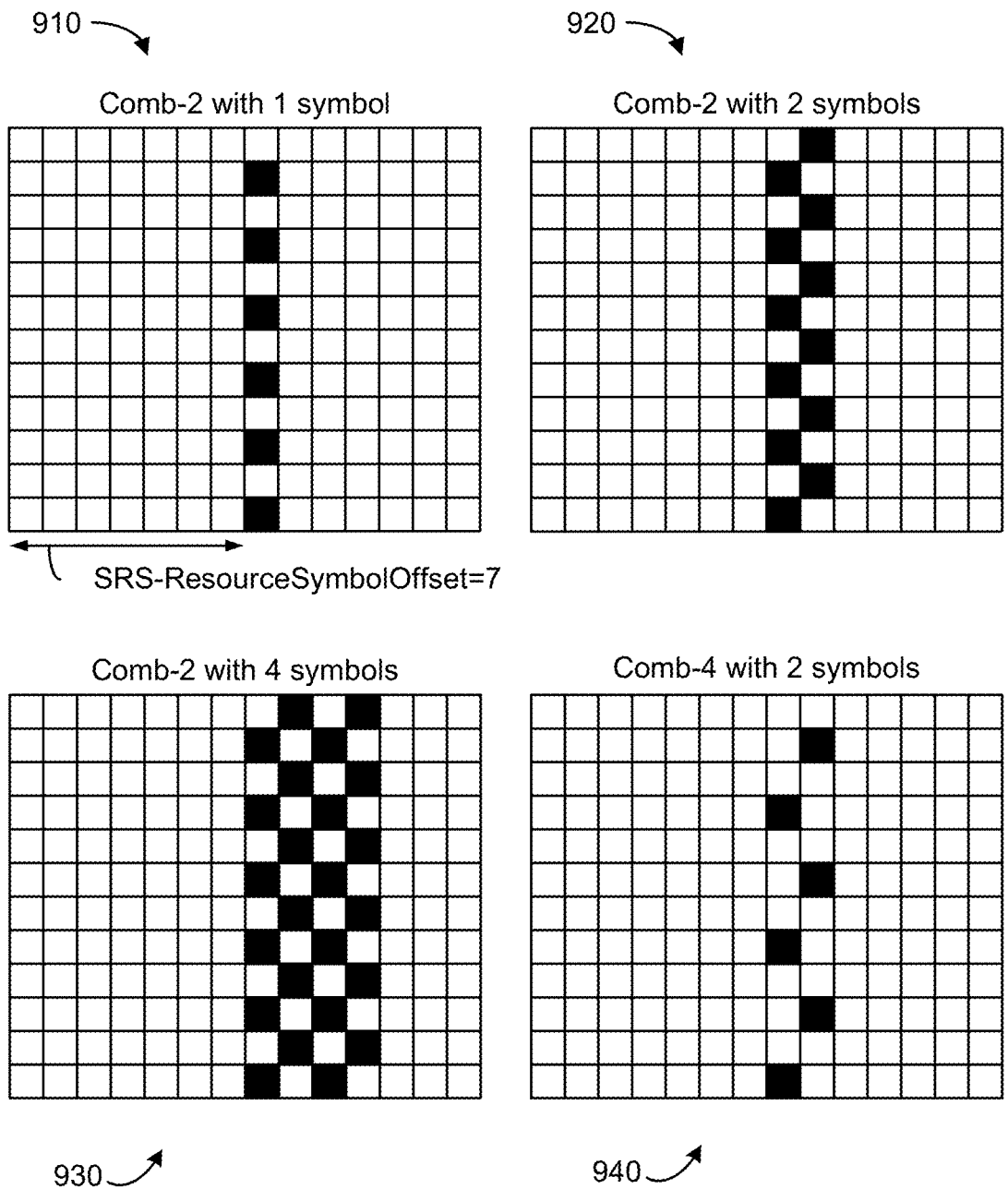

FIGS. 9A and 9B illustrate various comb patterns supported for SRS within a resource block. In FIGS. 9A and 9B, time is represented horizontally and frequency is represented vertically. Each large block in FIGS. 9A and 9B represents a resource block and each small block represents a resource element. In the example of FIGS. 9A and 9B, each resource block comprises 14 symbols in the time domain and 12 subcarriers in the frequency domain. The shaded resource elements carry, or are scheduled to carry, SRS. As such, the shaded resource elements in each resource block correspond to an SRS resource, or the portion of the SRS resource within one resource block (since an SRS resource can span multiple resource blocks in the frequency domain).

The illustrated comb patterns correspond to various SRS comb patterns described above. Specifically, FIG. 9A illustrates an SRS comb pattern 910 for comb-2 with one symbol, an SRS comb pattern 920 for comb-2 with two symbols, an SRS comb pattern 930 for comb-2 with four symbols, and an SRS comb pattern 940 for comb-4 with two symbols. FIG. 9B illustrates an SRS comb pattern 950 for comb-4 with four symbols, an SRS comb pattern 960 for comb-8 with four symbols, an SRS comb pattern 970 for comb-4 with eight symbols, and an SRS comb pattern 980 for comb-8 with eight symbols.

Figure 10A:
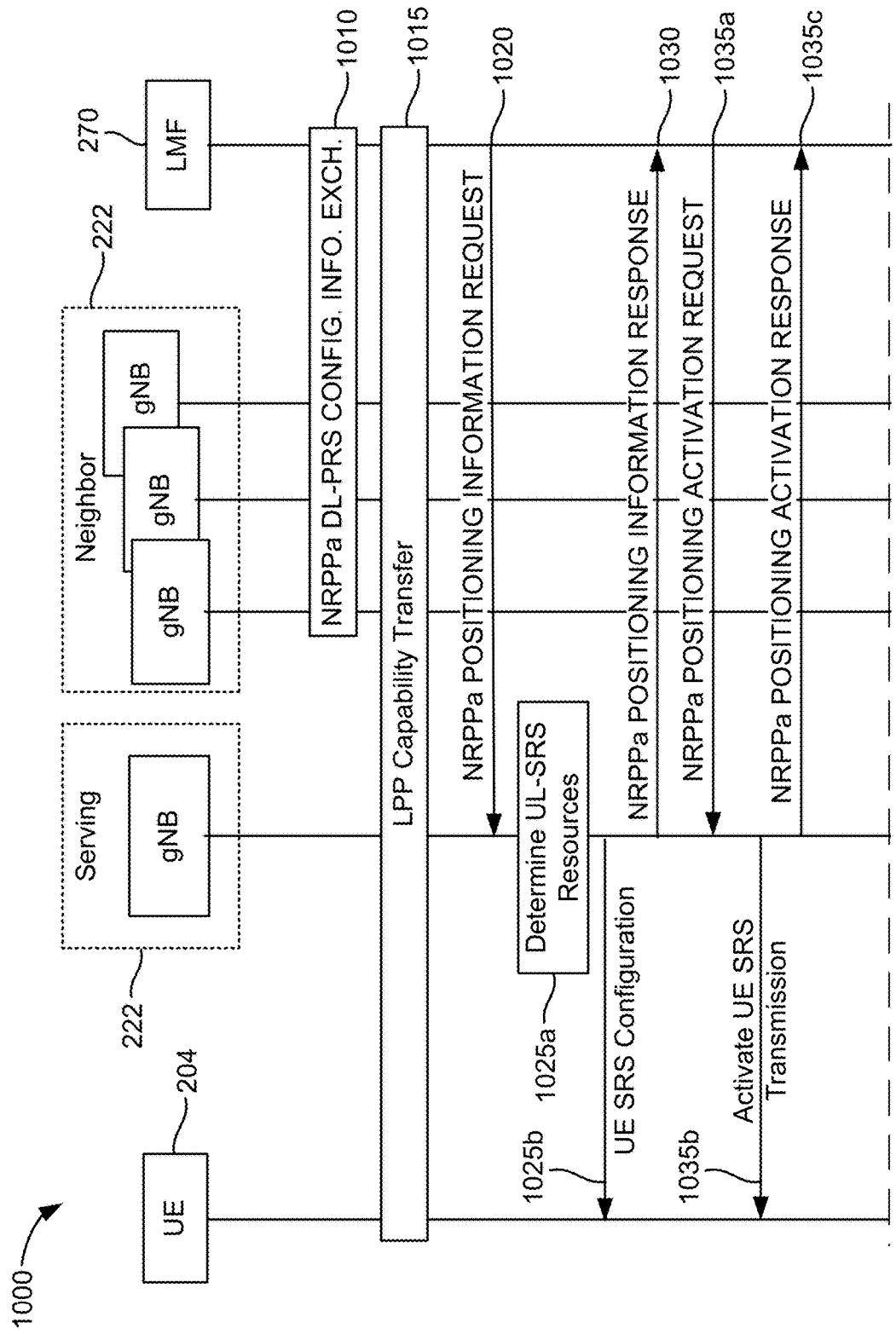
FIGS. 10A and 10B illustrate an example uplink-only positioning procedure using LPP for timing error group (TEG) reporting, according to aspects of the disclosure.
Figure 10B:
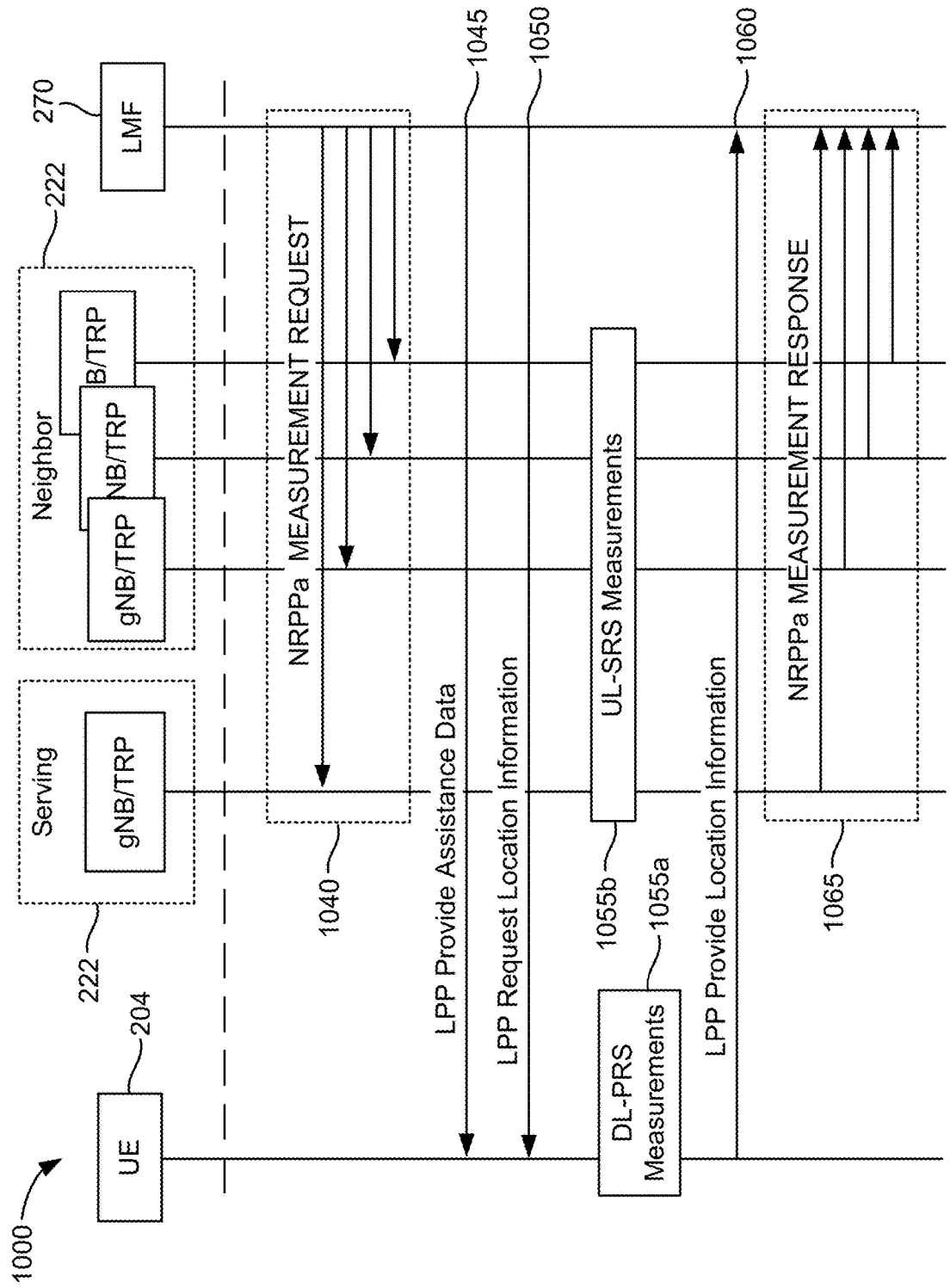

FIGS. 10A and 10B illustrate an example downlink-and-uplink-based positioning procedure 1000, according to aspects of the disclosure. A downlink-based or uplink-based positioning procedure would be a subset of the downlink-and-uplink-based positioning procedure 1000. The downlink-and-uplink-based positioning procedure 1000 may be, for example, a multi-RTT positioning procedure.

At stage 1010, the LMF 270 performs a DL-PRS configuration information exchange with the serving and neighbor gNBs 222 of the target UE 204 via NR positioning protocol type A (NRPPa) signaling. At stage 1015, the LMF 270 performs an LPP capability transfer procedure with the UE 204 (e.g., an LPP capability transfer procedure 510). At stage 1020, the LMF 270 sends an NRPPa Positioning Information Request to the target UE's 204 serving gNB 222 (or TRP) to request UL-SRS configuration information for the UE 204. The LMF 270 may provide any assistance data needed by the serving gNB 222 (e.g., pathloss reference, spatial relation, SSB configuration, etc.). At stage 1025a, the serving gNB 222 determines the resources available for UL-SRS and, at stage 1025b, provides the UL-SRS configuration information to the UE 204. At stage 1030, the serving gNB 222 sends an NRPPa Positioning Information Response message to the LMF 270. The NRPPa Positioning Information Response message includes the UL-SRS configuration information sent to the UE 204.

At stage 1035a, the LMF 270 sends an NRPPa Positioning Activation Request message to the serving gNB 222 instructing it to configure the UE 204 to activate UL-SRS transmission on the configured/allocated resources. The UL-SRS may be aperiodic (e.g., on-demand) UL-SRS, and therefore, at stage 1035b, the serving gNB 222 configures/ instructs the UE 204 to activate (i.e., begin) UL-SRS transmission. At stage 1035c, the serving gNB 222 sends an NRPPa Positioning Activation Response message to the LMF 270 to indicate that UL-SRS transmission has been activated.

At stage 1040, the LMF 270 sends an NRPPa Measurement Request message to the gNBs 222. The NRPPa Measurement Request message includes all information needed to enable the gNBs 222 to perform uplink measurements of the UL-SRS transmissions from the target UE 204. The request also includes the type of measurement(s) to perform, such as UL-SRS-RSRP, UL-AoA, gNB Rx-Tx time difference, etc. At stage 1045, the LMF 270 sends assistance data to the UE 204 for the downlink-and-uplink-based positioning procedure 1000 in one or more LPP Provide Assistance Data messages (e.g., as in the LPP assistance data transfer procedure 530). The LPP Provide Assistance Data message(s) includes all information needed to enable the UE 204 to perform positioning measurements (e.g., Rx-Tx time difference measurements) of the DL-PRS transmissions from the gNBs 222.

At stage 1050, the LMF 270 sends an LPP Request Location Information message to the target UE 204 (e.g., as in the LPP location information transfer procedure 550). At stage 1055a, the target UE 204 performs measurements (e.g., UE Rx-Tx time difference measurements) of the DL-PRS transmitted by the involved gNBs based on the assistance data received at stage 1045. At stage 1055b, the involved gNBs 222 perform measurements (e.g., gNB Rx-Tx time difference measurements) of the UL-SRS transmitted by the target UE 204 based on the assistance data received at stage 1040 in the NRPPa Measurement Request message.

At stage 1060, the target UE 204 sends an LPP Provide Location Information message (e.g., as in the LPP location information transfer procedure 550). The LPP Provide Location Information message includes the positioning measurements performed by the UE 204 at stage 1055a, such as UE Rx-Tx time difference measurements for each gNB 222, DL-PRS-RSRP measurements for each gNB 222, etc. At stage 1065, the involved gNBs 222 send NRPPa Measurement Response messages to the LMF 270. The NRPPa Measurement Response messages include the measurements of the UL-SRS measured at stage 1055b, such as gNB Rx-Tx time difference measurements, UL-SRS-RSRP measurements, UL-AoA measurements, etc.

Based on the measurements received at stages 1060 and 1065 (e.g., UE Rx-Tx and gNB Rx-Tx time difference measurements), the LMF 270 determines the RTTs between the UE and the gNBs 222. The LMF 270 then determines the position of the UE 204 based on the RTTs, the speed of light, and the known locations of the involved gNBs 222.

An LPP Request Location Information message (e.g., as at stage 1050 of FIG. 10B and in the LPP location information transfer procedure 550) may include a QoS information element defining the response time (i.e., desired latency) for the LPP Provide Location Information message (e.g., as at stage 1060 of FIG. 10B and in the LPP location information transfer procedure 550). The response time is the time permitted between reception of the LPP Request Location Information message and transmission of the LPP Provide Location Information message.

FIG. 11 illustrates an example "QoS" IE 1100 and an example "ResponseTime" IE 1150, according to aspects of the disclosure. A UE may receive the "QoS" IE 1100 in an LPP Request Location Information message. As shown in FIG. 11, the "QoS" IE 1100 includes a "responseTime" field that points to a "ResponseTime" IE 1150. In the "ResponseTime" IE 1150, the "time" field indicates the maximum response time as measured between receipt of the LPP Request Location Information message and transmission of an LPP Provide Location Information message.

The "responseTimeEarlyFix" field indicates the maximum response time as measured between receipt of the LPP Request Location Information message and transmission of an LPP Provide Location Information message containing early location measurements or an early location estimate. When this IE is included, a target device should send an LPP Provide Location Information message (or more than one LPP Provide Location Information message if the location information will not fit into a single message) containing early location information according to the "responseTimeEarlyFix" IE and a subsequent LPP Provide Location Information message (or more than one LPP Provide Location Information message if location information will not fit into a single message) containing final location information according to the "time" IE. A target device should omit sending an LPP Provide Location Information message if the early location information is not available at the expiration of the time value in the "responseTimeEarlyFix" IE. A location server should set the "responseTimeEarlyFix" IE to a value less than that for the "time" IE. A target device should ignore the "responseTimeEarlyFix" IE if its value is not less than that for the "time" IE.

The "unit" field indicates the unit of the "time" and "responseTimeEarlyFix" fields. If the "unit" field is absent, the values of "time" and "responseTimeEarlyFix" fields are given as integer numbers of seconds between 1 and 128. If the "unit" field is present, the maximum response time is given in units of 10-seconds, between 10 and 1280 seconds. The enumerated value "ten-seconds" corresponds to a resolution of 10 seconds. If this field is absent, the unit/resolution is 1 second.

In the downlink-and-uplink-based positioning procedure 1000, stage 1055a is performed only if both the SRS and PRS configuration is available. If either of the DL-PRS or UL-SRS configuration is not available before the LPP Request Location Information message is received from the LMF 270, the UE 204 will abort the positioning session and send the appropriate error cause.

For a multi-RTT positioning procedure, the "NR-Multi-RTT-Error" information element (IE) is used by the location server or the target device to provide multi-RTT error reasons to the target device or the location server, respectively. An "NR-Multi-RTT-Error" IE includes a "locationServerErrorCauses" field pointing to an "NR-Multi-RTT-LocationServerErrorCauses" IE and a "targetDeviceErrorCauses" field pointing to an "NR-Multi-RTT-TargetDeviceErrorCauses" IE.

FIG. 12 illustrates an example "NR-Multi-RTT-LocationServerErrorCauses" IE 1200 and an example "NR-Multi-RTT-TargetDeviceErrorCauses" IE 1250, according to aspects of the disclosure. The "NR-Multi-RTT-LocationServerErrorCauses" IE 1200 is used by the location server to provide multi-RTT error reasons to the target device. The "NR-Multi-RTT-TargetDeviceErrorCauses" IE 1250 is used by the target device to provide multi-RTT error reasons to the location server.

Two error cases may occur at the start of a downlink-and-uplink-based positioning session, such as a multi-RTT positioning session. As a first case, the UE 204 receives an LPP Request Location Information message (e.g., as at stage 1050 of FIG. 10B and in the LPP location information transfer procedure 550) without having received DL-PRS configuration assistance data from the LMF 270. In this case, the UE 204 will abort the positioning session in response to receiving the LPP Request Location Information message and send the error cause "dl-assistance-data-missing" in the "NR-Multi-RTT-TargetDeviceErrorCauses" IE 1250.

As a second case, the UE 204 receives an LPP Request Location Information message (e.g., as at stage 1050 of FIG. 10B and in the LPP location information transfer procedure 550) without having been configured with SRS resources by the serving gNB 222. In this case, the UE 204 will abort the positioning session in response to receiving the LPP Request Location Information message and send the error cause "ul-srs-configuration-missing" in the "NR-Multi-RTT-TargetDeviceErrorCauses" IE 1250.

In both cases, the UE 204 assumes that it should be configured with both PRS and SRS resources before receiving an LPP Request Location Information message. Generally, since the LMF 270 provides the PRS configuration (e.g., in the LPP Provide Assistance Data message at stage 1045), the LMF 270 will not send an LPP Provide Location Information message until after sending the PRS configuration to the UE 204. However, since the serving gNB 222 provides the SRS configuration to the UE 204, the LMF 270 may not know whether the SRS configuration has been delivered before it sends the LPP Request Location Information message.

Figure 13:
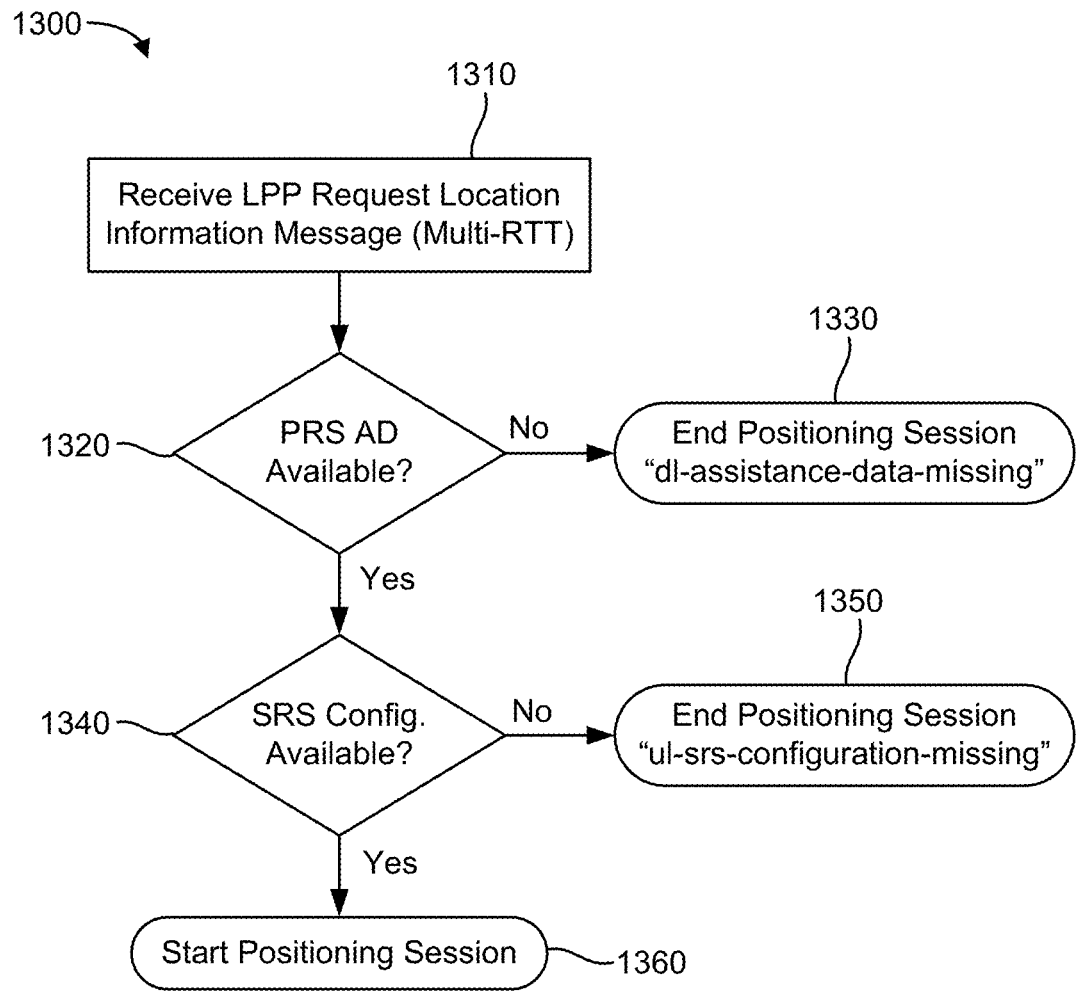
FIG. 13 illustrates a conventional method for determining whether to start or abort a positioning session

FIG. 13 illustrates a conventional method 1300 for determining whether to start or abort a positioning session, such as a multi-RTT positioning session or other downlink-and-uplink-based positioning session. The method 1300 may be performed by a target device (e.g., any of the UEs described herein).

At 1310, the UE receives an LPP Request Location Information message (e.g., as at stage 1050 of FIG. 10B and in the LPP location information transfer procedure 550). At 1320, the UE determines whether it has received a PRS configuration for the positioning session in assistance data (AD) for the positioning session from the location server (e.g., LMF 270). The PRS configuration may, or may not, have been received in an LPP Provide Assistance Data message (e.g., as at stage 1045 of FIG. 10B and in the LPP assistance data transfer procedure 530). If a PRS configuration has not been received, then, at 1330, the UE ends the positioning session and sends, to the location server, the error cause "dl-assistance-data-missing" in an "NR-Multi-RTT-TargetDeviceErrorCauses" IE 1250.

If the UE has received a PRS configuration, then at 1340, the UE determines whether an SRS configuration for the positioning session has been received from the UE's serving base station (e.g., a gNB 222). The SRS configuration may, or may not, have been received as at stage 1025b of FIG. 10A. If an SRS configuration has not been received, then, at 1350, the UE ends the positioning session and sends, to the location server, the error cause "ul-srs-configuration-missing" in an "NR-Multi-RTT-TargetDeviceErrorCauses" IE 1250. However, if an SRS configuration is available, then, at 1360, the UE starts the positioning session (e.g., performs PRS measurements as at stage 1055a of FIG. 10B).

Currently, there is no support for the case where the SRS configuration is delayed by some time, either by gNB implementation or radio link conditions. Accordingly, the present disclosure provides techniques to address the delayed SRS configuration scenario.

In an aspect, instead of declaring a positioning session failure immediately after receiving the LPP Request Location Information message when the UE has not been configured with SRS resources, the UE can instead wait for some threshold amount of time "T" to receive an SRS configuration from its serving base station. If the UE receives the SRS configuration within time T, the UE can start the positioning session. If, however, the UE does not receive an SRS configuration within time T, the UE can abort the positioning session with the error cause "ul-srs-configuration-missing" in an "NR-Multi-RTT-TargetDeviceErrorCauses" IE 1250.

Note that the UE should not begin performing PRS measurements upon reception of the LPP Request Location Information message, but rather, should wait until it has received the SRS configuration. In addition, the configured PRS should be periodically transmitted, as on-demand or aperiodic PRS may be transmitted before the expiration of the time T.

Figure 14:
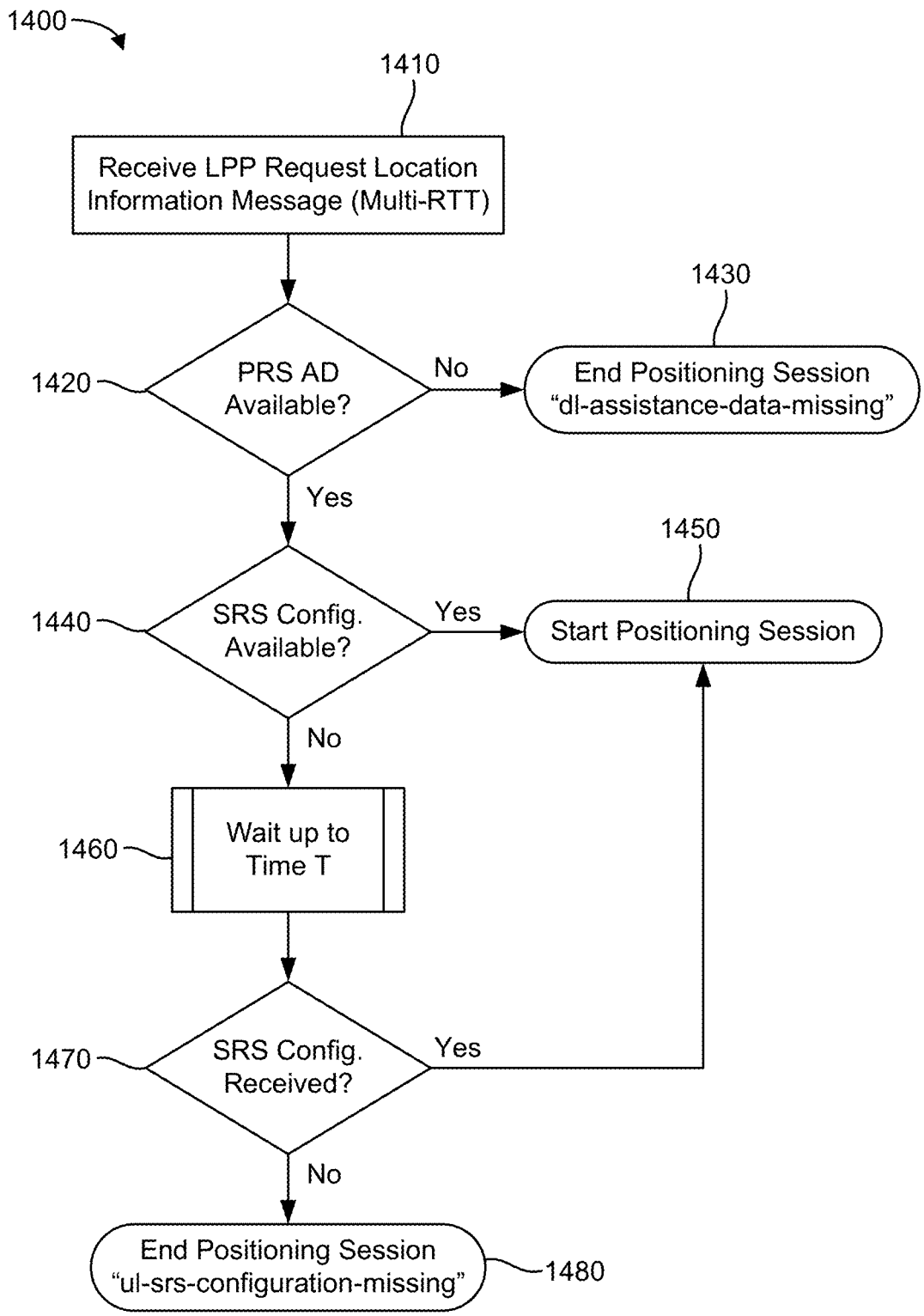
FIG. 14 illustrates an example method for determining whether to start or abort a positioning session, such as a multi-RTT positioning session or other downlink-and-uplink-based positioning session, according to aspects of the disclosure.

FIG. 14 illustrates an example method 1400 for determining whether to start or abort a positioning session, such as a multi-RTT positioning session or other downlink-and-uplink-based positioning session, according to aspects of the disclosure. The method 1400 may be performed by a target device (e.g., any of the UEs described herein).

At 1410, the UE receives an LPP Request Location Information message (e.g., as at stage 1050 of FIG. 10B and in the LPP location information transfer procedure 550). At 1420, the UE determines whether it has received a PRS configuration for the positioning session in assistance data (AD) for the positioning session from the location server (e.g., LMF 270). The PRS configuration may, or may not, have been received in an LPP Provide Assistance Data message (e.g., as at stage 1045 of FIG. 10B and in the LPP assistance data transfer procedure 530). If a PRS configuration has not been received, then, at 1430, the UE ends the positioning session and sends, to the location server, the error cause "dl-assistance-data-missing" in an "NR-Multi-RTT-TargetDeviceErrorCauses" IE 1250.

If the UE has received a PRS configuration, then at 1440, the UE determines whether an SRS configuration for the positioning session has been received from the UE's serving base station (e.g., a gNB 222). The SRS configuration may, or may not, have been received as at stage 1025b of FIG. 10A. If an SRS configuration is available, then, at 1450, the UE starts the positioning session (e.g., performs PRS measurements as at stage 1055a of FIG. 10B).

If, however, an SRS configuration has not been received, then, at 1460, the UE waits up to a threshold period of time T. For example, the UE may set a timer for the time T upon determining, at 1440, that the SRS configuration has not been received. At 1470, upon expiration of time T, the UE determines whether an SRS configuration was received. In an aspect, reception of an SRS configuration may interrupt the timer and cause the time T to expire, in which case, the UE would make the determination at 1470 immediately after reception of the SRS configuration. Alternatively, reception of an SRS configuration may not interrupt the timer, and the UE may always wait the full amount of time T to make the determination at 1470, regardless of when during that time period an SRS configuration is received. Thus, the time T may be a timer that can be interrupted or a fixed period of time.

If an SRS configuration was received before the expiration of time T, then, at 1450, the UE starts the positioning session (e.g., performs PRS measurements as at stage 1055a of FIG. 10B). If, however, an SRS configuration was not received, then, at 1480, the UE ends the positioning session and sends, to the location server, the error cause "ul-srs-configuration-missing" in an "NR-Multi-RTT-TargetDeviceErrorCauses" IE 1250.

In an aspect, the time T that the UE waits for the reception of an SRS configuration may be a function of the response time defined in the "QoS" IE 1100. For example, if the response time is large (e.g., above some threshold), the UE can wait longer to receive the SRS configuration. If, however, the response time is shorter (e.g., below some threshold), the UE should wait for less time to receive an SRS configuration. The UE may determine the value of T itself, or the value of T may be configured to the UE by the location server (e.g., in an LPP Provide Assistance Data message or an LPP Request Location Information message) or serving base station (e.g., via RRC signaling, a MAC control element (MAC-CE), DCI, etc.). The value of T may be determined or provided as some number of symbols, slots, subframes, frames, milliseconds, seconds, etc.

With the above techniques, a UE will not abort a positioning session simply because the SRS configuration was delayed.

Figure 15:
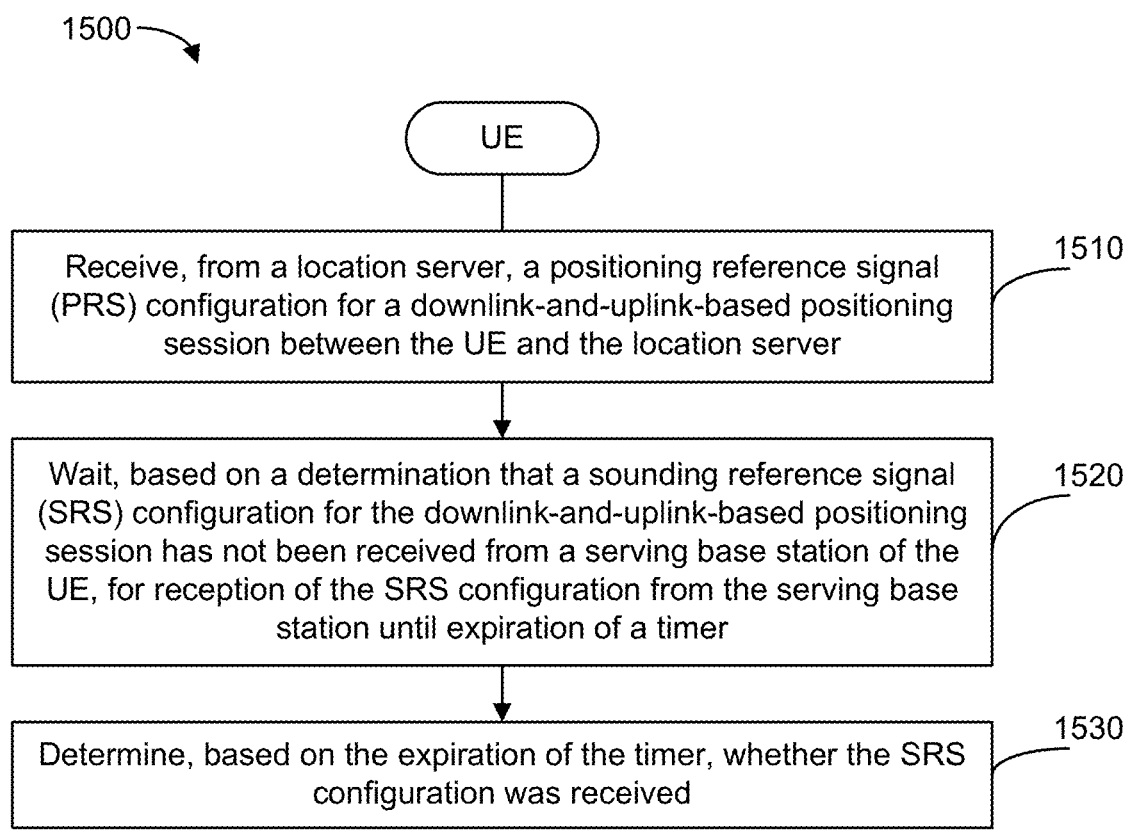
FIG. 15 illustrates an example method of wireless communication, according to aspects of the disclosure.

FIG. 15 illustrates an example method 1500 of wireless communication, according to aspects of the disclosure. In an aspect, method 1500 may be performed by a UE (e.g., any of the UEs described herein).

At 1510, the UE receives, from a location server (e.g., LMF 270), a PRS configuration (e.g., in an LPP Provide Assistance Data message) for a downlink-and-uplink-based positioning session (e.g., a multi-RTT positioning session) between the UE and the location server. In an aspect, operation 1510 may be performed by the one or more WWAN transceivers 310, the one or more processors 332, memory 340, and/or positioning component 342, any or all of which may be considered means for performing this operation.

At 1520, the UE waits, based on a determination that an SRS configuration for the downlink-and-uplink-based positioning session has not been received from a serving base station of the UE, for reception of the SRS configuration from the serving base station until expiration of a timer, as at 1460 of FIG. 14. In an aspect, operation 1520 may be performed by the one or more WWAN transceivers 310, the one or more processors 332, memory 340, and/or positioning component 342, any or all of which may be considered means for performing this operation.

At 1530, the UE determines, based on the expiration of the timer, whether the SRS configuration was received, as at 1470 of FIG. 14. In an aspect, operation 1530 may be performed by the one or more WWAN transceivers 310, the one or more processors 332, memory 340, and/or positioning component 342, any or all of which may be considered means for performing this operation.

As will be appreciated, a technical advantage of the method 1500 is that the UE does not prematurely abort the downlink-and-uplink-based positioning session due to delayed reception of the SRS configuration. This improves power efficiency, in that the network (e.g., LMF 270) will need to restart the positioning procedure after the UE prematurely aborts the positioning procedure.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an electrical insulator and an electrical conductor). Furthermore, it is also intended that aspects of a clause can be included in any other independent clause, even if the clause is not directly dependent on the independent clause.

Implementation examples are described in the following numbered clauses:

Clause 1. A method of wireless communication performed by a user equipment (UE), comprising: receiving, from a location server, a positioning reference signal (PRS) configuration for a downlink-and-uplink-based positioning session between the UE and the location server; waiting, based on a determination that a sounding reference signal (SRS) configuration for the downlink-and-uplink-based positioning session has not been received from a serving base station of the UE, for reception of the SRS configuration from the serving base station until expiration of a timer; and determining, based on the expiration of the timer, whether the SRS configuration was received.

Clause 2. The method of clause 1, further comprising: aborting the downlink-and-uplink-based positioning session based on the SRS configuration not having been received upon the expiration of the timer.

Clause 3. The method of clause 2, wherein aborting the downlink-and-uplink-based positioning session comprises: transmitting, to the location server, an error cause indicating the SRS configuration was not received.

Clause 4. The method of any of clauses 1 to 3, further comprising: initiating the downlink-and-uplink-based positioning session based on the SRS configuration having been received before the expiration of the timer.

Clause 5. The method of clause 4, wherein initiating the downlink-and-uplink-based positioning session comprises: measuring, based on the PRS configuration, one or more PRS resources transmitted by one or more base stations.

Clause 6. The method of clause 5, wherein the one or more PRS resources are periodic PRS resources.

Clause 7. The method of any of clauses 1 to 6, wherein a length of the timer is based on a response time for the downlink-and-uplink-based positioning session.

Clause 8. The method of clause 7, wherein: the length of the timer is longer based on the response time being above a threshold and shorter based on the response time being below the threshold.

Clause 9. The method of any of clauses 7 to 8, further comprising: determining the length of the timer based on the response time for the downlink-and-uplink-based positioning session.

Clause 10. The method of any of clauses 7 to 9, wherein the length of the timer is received from the location server in a Long-Term Evolution (LTE) positioning protocol (LPP) Provide Assistance Data message or an LPP Request Location Information message.

Clause 11. The method of any of clauses 7 to 10, wherein the length of the timer is received from the location server with the response time.

Clause 12. The method of any of clauses 7 to 11, wherein the length of the timer is received from the serving base station via radio resource control (RRC) signaling, a medium access control control element (MAC-CE), or downlink control information (DCI).

Clause 13. The method of any of clauses 7 to 12, wherein the length of the timer is given in symbols, slots, subframes, frames, milliseconds, or seconds.

Clause 14. A user equipment (UE), comprising: a memory; at least one transceiver; and at least one processor communicatively coupled to the memory and the at least one transceiver, the at least one processor configured to: receive, via the at least one transceiver, from a location server, a positioning reference signal (PRS) configuration for a downlink-and-uplink-based positioning session between the UE and the location server; wait, based on a determination that a sounding reference signal (SRS) configuration for the downlink-and-uplink-based positioning session has not been received from a serving base station of the UE, for reception of the SRS configuration from the serving base station until expiration of a timer; and determine, based on the expiration of the timer, whether the SRS configuration was received.

Clause 15. The UE of clause 14, wherein the at least one processor is further configured to: abort the downlink-and-uplink-based positioning session based on the SRS configuration not having been received upon the expiration of the timer.

Clause 16. The UE of clause 15, wherein the at least one processor configured to abort the downlink-and-uplink-based positioning session comprises the at least one processor configured to: transmit, via the at least one transceiver, to the location server, an error cause indicating the SRS configuration was not received.

Clause 17. The UE of any of clauses 14 to 16, wherein the at least one processor is further configured to: initiate the downlink-and-uplink-based positioning session based on the SRS configuration having been received before the expiration of the timer.

Clause 18. The UE of clause 17, wherein the at least one processor configured to initiate the downlink-and-uplink-based positioning session comprises the at least one processor configured to: measure, based on the PRS configuration, one or more PRS resources transmitted by one or more base stations.

Clause 19. The UE of clause 18, wherein the one or more PRS resources are periodic PRS resources.

Clause 20. The UE of any of clauses 14 to 19, wherein a length of the timer is based on a response time for the downlink-and-uplink-based positioning session.

Clause 21. The UE of clause 20, wherein: the length of the timer is longer based on the response time being above a threshold and shorter based on the response time being below the threshold.

Clause 22. The UE of any of clauses 20 to 21, wherein the at least one processor is further configured to: determine the length of the timer based on the response time for the downlink-and-uplink-based positioning session.

Clause 23. The UE of any of clauses 20 to 22, wherein the length of the timer is received from the location server in a Long-Term Evolution (LTE) positioning protocol (LPP) Provide Assistance Data message or an LPP Request Location Information message.

Clause 24. The UE of any of clauses 20 to 23, wherein the length of the timer is received from the location server with the response time.

Clause 25. The UE of any of clauses 20 to 24, wherein the length of the timer is received from the serving base station via radio resource control (RRC) signaling, a medium access control control element (MAC-CE), or downlink control information (DCI).

Clause 26. The UE of any of clauses 20 to 25, wherein the length of the timer is given in symbols, slots, subframes, frames, milliseconds, or seconds.

Clause 27. A user equipment (UE), comprising: means for receiving, from a location server, a positioning reference signal (PRS) configuration for a downlink-and-uplink-based positioning session between the UE and the location server; means for waiting, based on a determination that a sounding reference signal (SRS) configuration for the downlink-and-uplink-based positioning session has not been received from a serving base station of the UE, for reception of the SRS configuration from the serving base station until expiration of a timer; and means for determining, based on the expiration of the timer, whether the SRS configuration was received.

Clause 28. The UE of clause 27, further comprising: means for aborting the downlink-and-uplink-based positioning session based on the SRS configuration not having been received upon the expiration of the timer.

Clause 29. The UE of clause 28, wherein the means for aborting the downlink-and-uplink-based positioning session comprises: means for transmitting, to the location server, an error cause indicating the SRS configuration was not received.

Clause 30. The UE of any of clauses 27 to 29, further comprising: means for initiating the downlink-and-uplink-based positioning session based on the SRS configuration having been received before the expiration of the timer.

Clause 31. The UE of clause 30, wherein the means for initiating the downlink-and-uplink-based positioning session comprises: means for measuring, based on the PRS configuration, one or more PRS resources transmitted by one or more base stations.

Clause 32. The UE of clause 31, wherein the one or more PRS resources are periodic PRS resources.

Clause 33. The UE of any of clauses 27 to 32, wherein a length of the timer is based on a response time for the downlink-and-uplink-based positioning session.

Clause 34. The UE of clause 33, wherein: the length of the timer is longer based on the response time being above a threshold and shorter based on the response time being below the threshold.

Clause 35. The UE of any of clauses 33 to 34, further comprising: means for determining the length of the timer based on the response time for the downlink-and-uplink-based positioning session.

Clause 36. The UE of any of clauses 33 to 35, wherein the length of the timer is received from the location server in a Long-Term Evolution (LTE) positioning protocol (LPP) Provide Assistance Data message or an LPP Request Location Information message.

Clause 37. The UE of any of clauses 33 to 36, wherein the length of the timer is received from the location server with the response time.

Clause 38. The UE of any of clauses 33 to 37, wherein the length of the timer is received from the serving base station via radio resource control (RRC) signaling, a medium access control control element (MAC-CE), or downlink control information (DCI).

Clause 39. The UE of any of clauses 33 to 38, wherein the length of the timer is given in symbols, slots, subframes, frames, milliseconds, or seconds.

Clause 40. A non-transitory computer-readable medium storing computer-executable instructions that, when executed by a user equipment (UE), cause the UE to: receive, from a location server, a positioning reference signal (PRS) configuration for a downlink-and-uplink-based positioning session between the UE and the location server; wait, based on a determination that a sounding reference signal (SRS) configuration for the downlink-and-uplink-based positioning session has not been received from a serving base station of the UE, for reception of the SRS configuration from the serving base station until expiration of a timer; and determine, based on the expiration of the timer, whether the SRS configuration was received.

Clause 41. The non-transitory computer-readable medium of clause 40, further comprising computer-executable instructions that, when executed by the UE, cause the UE to: abort the downlink-and-uplink-based positioning session based on the SRS configuration not having been received upon the expiration of the timer.

Clause 42. The non-transitory computer-readable medium of clause 41, wherein the computer-executable instructions that, when executed by the UE, cause the UE to abort the downlink-and-uplink-based positioning session comprise computer-executable instructions that, when executed by the UE, cause the UE to: transmit, to the location server, an error cause indicating the SRS configuration was not received.

Clause 43. The non-transitory computer-readable medium of any of clauses 40 to 42, further comprising computer-executable instructions that, when executed by the UE, cause the UE to: initiate the downlink-and-uplink-based positioning session based on the SRS configuration having been received before the expiration of the timer.

Clause 44. The non-transitory computer-readable medium of clause 43, wherein the computer-executable instructions that, when executed by the UE, cause the UE to initiate the downlink-and-uplink-based positioning session comprise computer-executable instructions that, when executed by the UE, cause the UE to: measure, based on the PRS configuration, one or more PRS resources transmitted by one or more base stations.

Clause 45. The non-transitory computer-readable medium of clause 44, wherein the one or more PRS resources are periodic PRS resources.

Clause 46. The non-transitory computer-readable medium of any of clauses 40 to 45, wherein a length of the timer is based on a response time for the downlink-and-uplink-based positioning session.

Clause 47. The non-transitory computer-readable medium of clause 46, wherein: the length of the timer is longer based on the response time being above a threshold and shorter based on the response time being below the threshold.

Clause 48. The non-transitory computer-readable medium of any of clauses 46 to 47, further comprising computer-executable instructions that, when executed by the UE, cause the UE to: determine the length of the timer based on the response time for the downlink-and-uplink-based positioning session.

Clause 49. The non-transitory computer-readable medium of any of clauses 46 to 48, wherein the length of the timer is received from the location server in a Long-Term Evolution (LTE) positioning protocol (LPP) Provide Assistance Data message or an LPP Request Location Information message.

Clause 50. The non-transitory computer-readable medium of any of clauses 46 to 49, wherein the length of the timer is received from the location server with the response time.

Clause 51. The non-transitory computer-readable medium of any of clauses 46 to 50, wherein the length of the timer is received from the serving base station via radio resource control (RRC) signaling, a medium access control control element (MAC-CE), or downlink control information (DCI).

Clause 52. The non-transitory computer-readable medium of any of clauses 46 to 51, wherein the length of the timer is given in symbols, slots, subframes, frames, milliseconds, or seconds.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programmable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of wireless communication performed by a user equipment (UE), comprising:
   receiving, from a location server, a positioning reference signal (PRS) configuration for a downlink-and-uplink-based positioning session between the UE and the location server;
   waiting, based on a determination that a sounding reference signal (SRS) configuration for the downlink-and-uplink-based positioning session has not been received from a serving base station of the UE, for reception of the SRS configuration from the serving base station until expiration of a timer; and
   determining, based on the expiration of the timer, whether the SRS configuration was received.

2. The method of claim 1, further comprising:
   aborting the downlink-and-uplink-based positioning session based on the SRS configuration not having been received upon the expiration of the timer.

3. The method of claim 2, wherein aborting the downlink-and-uplink-based positioning session comprises:
   transmitting, to the location server, an error cause indicating the SRS configuration was not received.

4. The method of claim 1, further comprising:
   initiating the downlink-and-uplink-based positioning session based on the SRS configuration having been received before the expiration of the timer.

5. The method of claim 4, wherein initiating the downlink-and-uplink-based positioning session comprises:
   measuring, based on the PRS configuration, one or more PRS resources transmitted by one or more base stations.

6. The method of claim 5, wherein the one or more PRS resources are periodic PRS resources.

7. The method of claim 1, wherein a length of the timer is based on a response time for the downlink-and-uplink-based positioning session.

8. The method of claim 7, wherein:
   the length of the timer is longer based on the response time being above a threshold and shorter based on the response time being below the threshold.

9. The method of claim 7, further comprising:
   determining the length of the timer based on the response time for the downlink-and-uplink-based positioning session.

10. The method of claim 7, wherein the length of the timer is received from the location server in a Long-Term Evolution (LTE) positioning protocol (LPP) Provide Assistance Data message or an LPP Request Location Information message.

11. The method of claim 7, wherein the length of the timer is received from the location server with the response time.

12. The method of claim 7, wherein the length of the timer is received from the serving base station via radio resource control (RRC) signaling, a medium access control control element (MAC-CE), or downlink control information (DCI).

13. The method of claim 7, wherein the length of the timer is given in symbols, slots, subframes, frames, milliseconds, or seconds.

14. A user equipment (UE), comprising:
    a memory;
    at least one transceiver; and
    at least one processor communicatively coupled to the memory and the at least one transceiver, the at least one processor configured to:
      receive, via the at least one transceiver, from a location server, a positioning reference signal (PRS) configuration for a downlink-and-uplink-based positioning session between the UE and the location server;
      wait, based on a determination that a sounding reference signal (SRS) configuration for the downlink-and-uplink-based positioning session has not been received from a serving base station of the UE, for reception of the SRS configuration from the serving base station until expiration of a timer; and
      determine, based on the expiration of the timer, whether the SRS configuration was received.

15. The UE of claim 14, wherein the at least one processor is further configured to:
    abort the downlink-and-uplink-based positioning session based on the SRS configuration not having been received upon the expiration of the timer.

16. The UE of claim 15, wherein the at least one processor configured to abort the downlink-and-uplink-based positioning session comprises the at least one processor configured to:
    transmit, via the at least one transceiver, to the location server, an error cause indicating the SRS configuration was not received.

17. The UE of claim 14, wherein the at least one processor is further configured to:
    initiate the downlink-and-uplink-based positioning session based on the SRS configuration having been received before the expiration of the timer.

18. The UE of claim 17, wherein the at least one processor configured to initiate the downlink-and-uplink-based positioning session comprises the at least one processor configured to:

measure, based on the PRS configuration, one or more PRS resources transmitted by one or more base stations.

19. The UE of claim 18, wherein the one or more PRS resources are periodic PRS resources.

20. The UE of claim 14, wherein a length of the timer is based on a response time for the downlink-and-uplink-based positioning session.

21. The UE of claim 20, wherein:
the length of the timer is longer based on the response time being above a threshold and shorter based on the response time being below the threshold.

22. The UE of claim 20, wherein the at least one processor is further configured to:
determine the length of the timer based on the response time for the downlink-and-uplink-based positioning session.

23. The UE of claim 20, wherein the length of the timer is received from the location server in a Long-Term Evolution (LTE) positioning protocol (LPP) Provide Assistance Data message or an LPP Request Location Information message.

24. The UE of claim 20, wherein the length of the timer is received from the location server with the response time.

25. The UE of claim 20, wherein the length of the timer is received from the serving base station via radio resource control (RRC) signaling, a medium access control control element (MAC-CE), or downlink control information (DCI).

26. The UE of claim 20, wherein the length of the timer is given in symbols, slots, subframes, frames, milliseconds, or seconds.

27. A user equipment (UE), comprising:
means for receiving, from a location server, a positioning reference signal (PRS) configuration for a downlink-and-uplink-based positioning session between the UE and the location server;
means for waiting, based on a determination that a sounding reference signal (SRS) configuration for the downlink-and-uplink-based positioning session has not been received from a serving base station of the UE, for reception of the SRS configuration from the serving base station until expiration of a timer; and
means for determining, based on the expiration of the timer, whether the SRS configuration was received.

28. The UE of claim 27, further comprising:
means for aborting the downlink-and-uplink-based positioning session based on the SRS configuration not having been received upon the expiration of the timer.

29. The UE of claim 27, further comprising:
means for initiating the downlink-and-uplink-based positioning session based on the SRS configuration having been received before the expiration of the timer.

30. A non-transitory computer-readable medium storing computer-executable instructions that, when executed by a user equipment (UE), cause the UE to:
receive, from a location server, a positioning reference signal (PRS) configuration for a downlink-and-uplink-based positioning session between the UE and the location server;
wait, based on a determination that a sounding reference signal (SRS) configuration for the downlink-and-uplink-based positioning session has not been received from a serving base station of the UE, for reception of the SRS configuration from the serving base station until expiration of a timer; and
determine, based on the expiration of the timer, whether the SRS configuration was received.

* * * * *